(12) United States Patent
Kusaka et al.

(10) Patent No.: US 8,204,358 B2
(45) Date of Patent: Jun. 19, 2012

(54) IMAGE AND AUDIO REPRODUCING APPARATUS AND METHOD

(75) Inventors: Hiroya Kusaka, Hyogo (JP); Shigeo Sakaue, Osaka (JP); Michiharu Uematsu, Osaka (JP)

(73) Assignee: Panasonic Corporation, Osaka (JP)

( * ) Notice: Subject to any disclaimer, the term of this patent is extended or adjusted under 35 U.S.C. 154(b) by 1639 days.

(21) Appl. No.: 11/552,179

(22) Filed: Oct. 24, 2006

(65) Prior Publication Data
US 2007/0041714 A1 Feb. 22, 2007

Related U.S. Application Data

(63) Continuation of application No. 09/979,491, filed as application No. PCT/JP01/02000 on Mar. 14, 2001, now Pat. No. 7,231,134.

(30) Foreign Application Priority Data

| Mar. 14, 2000 | (JP) | 2000-070024 |
| Mar. 14, 2000 | (JP) | 2000-070025 |
| Mar. 14, 2000 | (JP) | 2000-070029 |
| Mar. 14, 2000 | (JP) | 2000-070030 |
| Mar. 14, 2000 | (JP) | 2000-070031 |
| Mar. 14, 2000 | (JP) | 2000-070033 |

(51) Int. Cl.
*H04N 9/80* (2006.01)
(52) U.S. Cl. .................................................. 386/239
(58) Field of Classification Search .................. 386/239, 386/248, 353
See application file for complete search history.

(56) References Cited

U.S. PATENT DOCUMENTS

| 5,095,445 A | 3/1992 | Sekiguchi |
| 5,493,335 A | 2/1996 | Parulski et al. |
| 5,537,626 A | 7/1996 | Kraslavsky et al. |
| 5,802,314 A | 9/1998 | Tullis et al. |
| 5,806,005 A | 9/1998 | Hull et al. |
| 5,909,551 A * | 6/1999 | Tahara et al. .......... 709/231 |
| 5,930,450 A | 7/1999 | Fujita |
| 5,933,478 A | 8/1999 | Ozaki et al. |

(Continued)

FOREIGN PATENT DOCUMENTS

EP 0 689 206 A1 12/1995

(Continued)

OTHER PUBLICATIONS

International Search Report for Application No. PCT/JP01/01999, dated May 29, 2001.

(Continued)

*Primary Examiner* — Thai Tran
*Assistant Examiner* — Mishawn Dunn
(74) *Attorney, Agent, or Firm* — RatnerPrestia

(57) ABSTRACT

At least one of a recorded image signal data, recorded audio signal data, and recorded image signal multiplex data, and reproduction information data describing the information about reproduction of at least one of the recorded image signal data, the recorded audio signal data, and the recorded image signal multiplex data or an arbitrary combination thereof, are stored. In this reproduction information data, the user can describe and edit by freely and easily combining the image data, audio data, and image/audio multiplex data. The CPU reads out image data and audio data from the storage means according to the reproduction information data, and decodes them, and converts the data format if necessary, and reproduces the image and audio in synchronism by using synchronization control means.

21 Claims, 37 Drawing Sheets

U.S. PATENT DOCUMENTS

| | | |
|---|---|---|
| 6,141,111 A | 10/2000 | Kato |
| 6,181,870 B1 | 1/2001 | Okada et al. |
| 6,442,252 B1 | 8/2002 | Fijise et al. |
| 6,507,887 B1 * | 1/2003 | Pontius et al. ............... 711/102 |
| 6,573,927 B2 | 6/2003 | Parulski et al. |
| 6,650,343 B1 | 11/2003 | Fujita et al. |
| 6,784,924 B2 | 8/2004 | Ward et al. |
| 2003/0007189 A1 | 1/2003 | Kusaka et al. |
| 2003/0012559 A1 | 1/2003 | Kusaka et al. |
| 2003/0018717 A1 | 1/2003 | Haley et al. |
| 2003/0090710 A1 | 5/2003 | Kusaka |
| 2005/0088690 A1 | 4/2005 | Haneda et al. |
| 2005/0144189 A1 | 6/2005 | Edwards et al. |

FOREIGN PATENT DOCUMENTS

| | | |
|---|---|---|
| EP | 0 730 272 A2 | 9/1996 |
| EP | 0 838 774 A2 | 4/1998 |
| EP | 0 860 829 A2 | 8/1998 |
| EP | 0 860 980 A2 | 8/1998 |
| EP | 0 912 036 A2 | 4/1999 |
| EP | 0 965 991 A1 | 12/1999 |
| EP | 0 994 480 A1 | 4/2000 |
| JP | 05-274232 A | 10/1993 |
| JP | 06-214904 A | 8/1994 |
| JP | 07-114634 | 5/1995 |
| JP | 07-184106 | 7/1995 |
| JP | 08-115278 A | 5/1996 |
| JP | 08-242326 | 9/1996 |
| JP | 09-146918 | 6/1997 |
| JP | 09-179806 | 7/1997 |
| JP | 10-051733 | 2/1998 |
| JP | 10-097639 | 4/1998 |
| JP | 10-224745 | 8/1998 |
| JP | 10-234002 | 9/1998 |
| JP | 10-283759 | 10/1998 |
| JP | 10-304292 | 11/1998 |
| JP | 11-055324 | 2/1999 |
| JP | 11-088808 | 3/1999 |
| JP | 11-143803 | 5/1999 |
| JP | 11-232440 | 8/1999 |
| JP | 11-313273 | 11/1999 |
| JP | 2000-029800 A | 1/2000 |
| JP | 2000-041212 | 2/2000 |
| JP | 2000-276418 | 10/2000 |
| WO | WO 99/48289 | 9/1999 |

OTHER PUBLICATIONS

Supplementary European Search Report for Application No. EP 01 91 2342, dated Sep. 4, 2006.

International Search Report for PCT/JP01/09402 dated Dec. 25, 2001.

Japanese International Search Report with English translation thereof for PCT/JP01/02000.

European Search Report for Application No. EP 01 91 2343, dated Jul. 10, 2006.

EP Office Action for 01 912 343.9, Nov. 4, 2010, Panasonic Corporation.

EP Office Action for 01 912 343.9, Feb. 16, 2012, Panasonic Corporation.

* cited by examiner

FIG.4

| Lines | Contents |
|---|---|
| 1 | GID=001 |
| 2 | IMG_SRC= File name of Image file B |
| 3 | IMG_SRC= File name of Image/Audio multiplex file A |
| 4 | SND_SRC= File name of Audio file A |
| 5 | SND_SRC= File name of Image/Audio multiplex file B |

FIG.7

| Lines | Contents |
|---|---|
| 1 | GID=001 |
| 2 | IMG_SRC= File name of Image file A |
| 3 | SND_SRC= File name of Audio file B |
| 4 | GID=002 |
| 5 | IMG_SRC= File name of Image file B |
| 6 | SND_SRC= File name of Image/Audio multiplex file B |

FIG.9

| Lines | Contents |
|---|---|
| 1 | GID=001 |
| 2 | CMP_SRC= File name of Image/Audio multiplex file A |
| 3 | CMP_SRC= File name of Image/Audio multiplex file B |

FIG.12

| Lines | Contents |
|---|---|
| 1 | GID=001 |
| 2 | IMG_SRC= File name of Image file B |
| 3 | SND_SRC= File name of Audio file A |
| 4 | GID=002 |
| 5 | CMP_SRC= File name of Image/Audio multiplex file B |
| 6 | GID=003 |
| 7 | IMG_SRC= File name of Image file C |
| 8 | SND_SRC= File name of Image/Audio multiplex file A |

FIG.16

| Lines | Contents |
|---|---|
| 1 | GID=001 |
| 2 | IMG_SRC= File name of Image file B |
| 3 | CMP_SRC= File name of Image/Audio multiplex file B |
| 4 | IMG_SRC= File name of Image file C |
| 5 | SND_SRC= File name of Audio file A |
| 6 | SND_SRC= File name of Audio file B |
| 7 | SND_SRC= File name of Image/Audio multiplex file A |

FIG.17

| Lines | Contents |
|---|---|
| 1 | GID=001 |
| 2 | IMG_SRC= File name of Image file B |
| 3 | SND_SRC= File name of Audio file A |
| 4 | SND_SRC= File name of Audio file B |
| 5 | GID=002 |
| 6 | CMP_SRC= File name of Image/Audio multiplex file B |
| 7 | GID=003 |
| 8 | IMG_SRC= File name of Image file C |
| 9 | SND_SRC= File name of Image/Audio multiplex file A |

FIG.19

| Lines | Contents |
|---|---|
| 1 | GID=001 |
| 2 | IMG_SRC= File name of Image file C |
| 3 | SND_SRC= File name of Image/Audio multiplex file A |
| 4 | GID=002 |
| 5 | CMP_SRC= File name of Image/Audio multiplex file B |
| 6 | GID=003 |
| 7 | IMG_SRC= File name of Image file B |
| 8 | SND_SRC=File name of Audio file A |

FIG.28

| Lines | Contents |
|---|---|
| 1 | GID=001 |
| 2 | IMG_SRC= File name of Image file B |
| 3 | ADD_SRC= File name of Frame image file B |
| 4 | IMG_SRC= File name of Image/Audio multiplex file A |
| 5 | ADD_SRC= Text file A |
| 6 | SND_SRC= File name of Audio file A |
| 7 | ADD_SRC= Sound effect sound file B |
| 8 | SND_SRC= File name of Image/Audio multiplex file B |

FIG.32

| Lines | Contents |
|---|---|
| 1 | GID=001 |
| 2 | IMG_SRC= File name of Image file B |
| 3 | PLY_DUR=1 0 |
| 4 | IMG_SRC= File name of Image/Audio multiplex file A |
| 5 | PLY_DUR=1 5 |
| 6 | SND_SRC= File name of Audio file A |
| 7 | PLY_DUR=2 0 |
| 8 | SND_SRC= File name of Image/Audio multiplex file B |
| 9 | PLY_DUR=5 |

FIG.35

| Lines | Contents |
|---|---|
| 1 | GID=001 |
| 2 | PLY_TTL=2 5 |
| 3 | IMG_SRC= File name of Image file B |
| 4 | PLY_TIM=0 |
| 5 | IMG_SRC= File name of Image/Audio multiplex file A |
| 6 | PLY_TIM=1 0 |
| 7 | SND_SRC= File name of Audio file A |
| 8 | PLY_TIM=0 |
| 9 | SND_SRC= File name of Image/Audio multiplex file B |
| 1 0 | PLY_DUR=2 0 |

FIG.36

| Lines | Contents |
|---|---|
| 1 | GID=001 |
| 2 | IMG_SRC= File name of Image file B |
| 3 | PLY_DUR=1 0 |
| 4 | PLY_STR=3 |
| 5 | IMG_SRC= File name of Image/Audio multiplex file A |
| 6 | PLY_DUR=1 5 |
| 7 | SND_SRC= File name of Audio file A |
| 8 | PLY_DUR=2 0 |
| 9 | SND_SRC= File name of Image/Audio multiplex file B |
| 1 0 | PLY_DUR=5 |

IMAGE AND AUDIO REPRODUCING APPARATUS AND METHOD

This application is a continuation of U.S. patent application Ser. No. 09/979,491, filed Feb. 11, 2002, now U.S. Pat. No. 7,231,134 which is a U.S. National Phase Application of PCT International Application PCT/JP2001/02000, filed Mar. 14, 2001, the entire disclosure of which is incorporated herein by reference.

TECHNICAL FIELD

The present invention relates to a image and audio reproducing apparatus and method for reproducing image signals and audio signals acquired by a image taking device such as a digital still camera or a digital video camera, automatically and continuously.

BACKGROUND ART

An example of video display system using a digital camera is disclosed in Japanese Laid-open Patent No. 11-88808. Herein, as shown in FIG. 37, a file name of a image file 3701 selected by the user on a digital camera is created as a display management information file 3702 on a memory card (flash memory card). A display control unit 3705 for controlling a display unit 3703 such as a liquid crystal display device in FIG. 37 obtains file names of images to be displayed from the display management information file 3702 of the memory card by a display management information acquiring unit 3704, and sequentially displays on the display unit 3703.

In this prior art, however, files being handled are only the files recording the image signals, and it is not assumed, for example, to reproduce independent audio data or audio data recorded simultaneously with taking images, in synchronism with images, and such technical means is not proposed.

SUMMARY OF THE INVENTION

The invention addresses the problems discussed above, and it is hence an object thereof to present a apparatus and method for reproducing image data, audio data, and image and audio multiplexed data continuously, as being freely and easily selected and combined by the user.

To deal with the problems, the image and audio reproducing apparatus and method of the invention is for storing at least one of recorded image signal data, recorded audio signal data, and image/audio signal multiplex data, and reproduction information data describing the information about reproduction of at least one of the recorded image signal data, the recorded audio signal data, and the recorded image/audio signal multiplex data or an arbitrary combination thereof, independently in at least one storage means individually.

In this apparatus or method, and in various modified forms shown below, according to the information about reproduction, the user can freely and easily combine data of various formats, such as a data file recording image signals, a data file recording audio signals, and a data file multiplex recording image signals and audio signals, and can reproduce easily and continuously, in synchronism between the image signals and the audio signals, by adding various information to image and audio, changing the sequence of reproduction, or making other changes.

In the invention, the reproduction information data may include the information for designating the data to be reproduced among the data stored in the storage means.

Also, the reproduction information data may include the information showing the sequence of reproducing the data stored in the storage means.

Also, the reproduction information data may include the information showing the duration of reproducing the data stored in the storage means.

Also, the reproduction information data may include the information showing the time of reproducing the data stored in the storage means.

In the reproduction information data, when designating the recorded image/audio signal multiplexed data, the image signal portion and audio signal portion of the recorded image/audio signal multiplexed data can be designated separately as the object of reproduction.

Also in the reproduction information data, the information about reproduction of the data is recorded at least in one group each, and one group includes at least one piece of information for designating the data to be reproduced.

Also in the reproduction information data, the information about reproduction of the data is recorded at least in one group each, and one group includes one piece each of the information for designating either the image signal portion of the recorded image signal data or the recorded image/audio signal multiplex data, or the audio signal portion of the recorded audio signal data or the recorded image/audio signal multiplex data.

Further, in the group of reproduction information data, when writing the information for designating the recorded image/audio signal multiplex data, the information for designating the recorded image signal data, the image signal portion of the recorded image/audio signal multiplex data, the recorded audio signal data, and the audio signal portion of the recorded image/audio signal multiplex data is not written in the same group.

In the invention and various modified examples, new reproduction information data can be created by editing reproduction information data in the group unit.

Also in the invention and various modified examples, the data format of recorded image signal data, recorded audio signal data, or recorded image/audio signal multiplex data reproduced according to the reproduction information data can be converted by format converting means.

Also in the invention and various modified examples, the image signals and audio signals reproduced according to the reproduction information data can be coded by encoding means.

Also in the invention and various modified examples, combined information data storing the information combining at least one of data the recorded image signal, recorded audio signal data, and recorded image/audio signal multiplex data is stored in the storage means, and the reproduction information data may include the information for designating the data to be reproduced, and the information for designating at least one combined information data.

Also in the invention and part of various modified examples, the information for designating the data to be reproduced may be a name given to the data to be reproduced.

Also in the invention and various modified examples, the image signals and audio signals are reproduced from the data held in the storage means according to the reproduction information data by using reproducing means.

In the modified example, the reproducing means is at least one of a decoder for compounding data, means for reading out data from the storage means, and a decoder for decoding data.

Among the modified examples using combined information, the combined information file is any one of image, audio and text contained in the data file recording image signals, data file recording audio signals, and data file multiplex recording image signals and audio signals.

BRIEF DESCRIPTION OF THE DRAWINGS

FIG. 4 is a diagram showing the content of automatic reproduction control file in embodiment 1.

FIG. 7 is a diagram showing the content of automatic reproduction control file in embodiment 2.

FIG. 9 is a diagram showing the content of automatic reproduction control file in embodiment 3.

FIG. 12 is a diagram showing the content of automatic reproduction control file in embodiment 4.

FIG. 16 shows an example of inappropriate writing of automatic reproduction control file for explaining an example of writing method of file designated by character string "CMP_SRC" in group in embodiment 4.

FIG. 17 shows an example of appropriate writing of automatic reproduction control file for explaining an example of writing method of file designated by character string "CMP_SRC" in group in embodiment 4.

FIG. 19 is a diagram showing the content of automatic reproduction control file in embodiment 5.

FIG. 28 is a diagram showing the content of automatic reproduction control file in embodiment 7.

FIG. 32 is a diagram showing the content of automatic reproduction control file in embodiment 8.

FIG. 35 is a diagram showing another example of automatic reproduction control file in embodiment 8.

FIG. 36 is a diagram showing another example of automatic reproduction control file in embodiment 8.

DETAILED DESCRIPTION OF THE PREFERRED EMBODIMENTS

Figure 1:
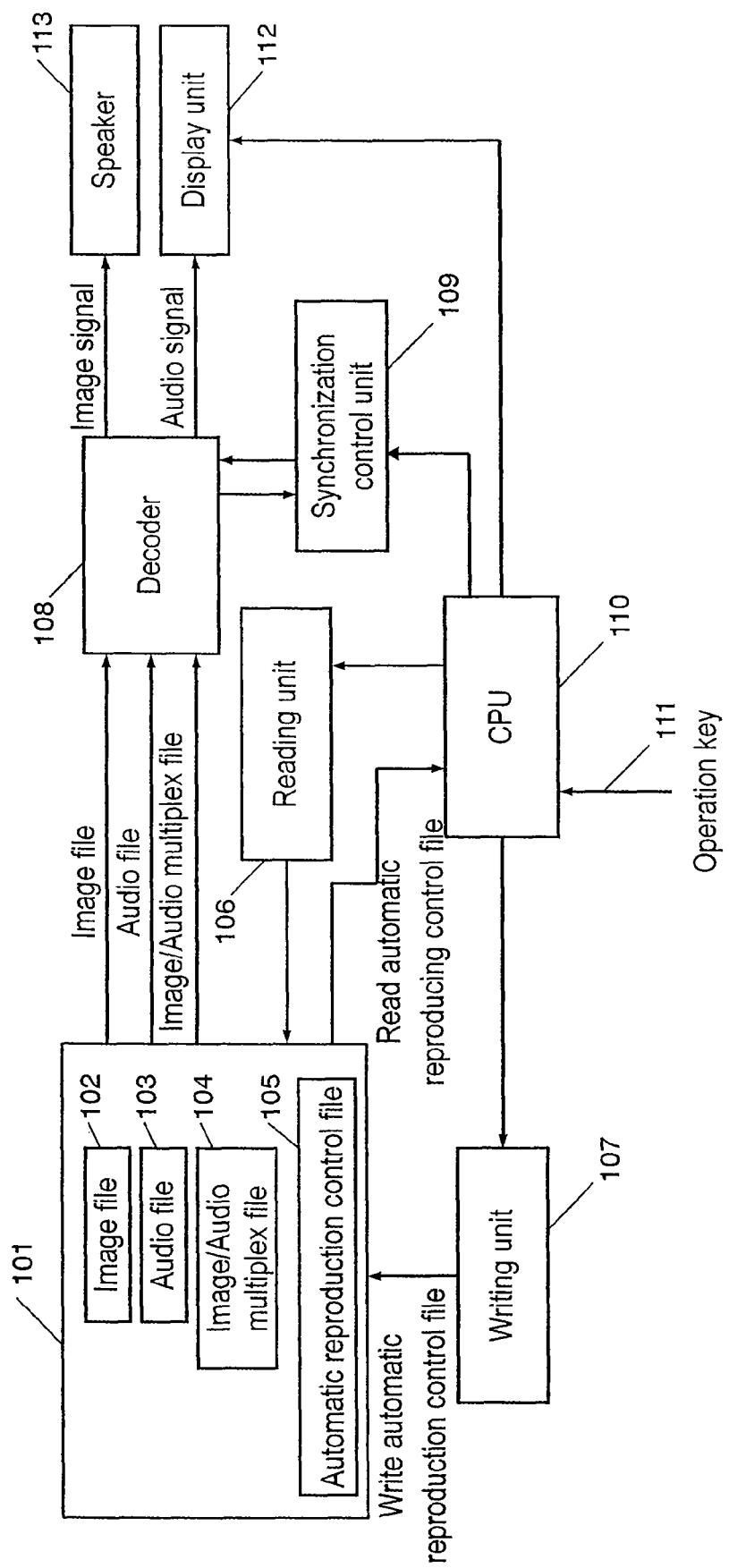
FIG. 1 is a block diagram of an image and audio reproducing apparatus in embodiments 1 to 5 of the invention.

Referring now to the drawings, preferred embodiments of the invention are described in detail below.

(Embodiment 1)

FIG. 1 is a block diagram of a image and audio reproducing apparatus in embodiments 1 to 5 of the invention. In FIG. 1, a storage unit 101 stores image and audio digital data acquired (coded) by a device such as a digital still camera, digital video camera, or scanner. In all other embodiments described below, the storage unit 101 may be either fixed means such as a hard disk device, or detachable means such as a flash memory card. Storage medium may be a semiconductor memory, magnetic disk, magnetic tape, optical disk, or the like. A image file 102 is a file of image data recorded in the storage unit 101, an audio file 103 is similarly a file of audio data, and a image/audio multiplex file 104 is similarly a file in which image data and audio data are multiplexed and stored in the same file. An automatic reproduction control file 105 is a file storing information showing reproduction data and reproduction sequence when reproducing the image file 102, audio file 103, and image/audio multiplex file 104 continuously in a combination. In FIG. 1, however, for the sake of simplicity, the image file 102, audio file 103, image/audio multiplex file 104, and automatic reproduction control file 105 are shown by one piece each, but not limited to this example, actually, each file may be present in a plurality. Meanwhile, all of the image file 102, audio file 103, and image/audio multiplex file 104 are not always recorded in the storage unit 101, but, for example, the image file 102 may not be recorded in the storage unit 101.

A reading unit 106 is means for reading out files recorded in the storage unit 101, and it is one of reproducing means. A writing unit 107 is means for writing an automatic reproduction control file 105 into the storage unit 101. A decoder 108 is one of reproducing means, and is means for decoding and reproducing the image file 102, audio file 103, and image/audio multiplex file 104 being read out from the storage unit 101. The reproducing means may refer to the decoder 108 only, or both the decoder 108 and reading unit 106, depending on the case. At this time, synchronization control unit 109 controls decoding by the decoder 108 so that the image signal and audio signal issued from the decoder 108 according to the information of the automatic reproduction control file 105 may be in the specified synchronized relation exactly conforming to the information of the automatic reproduction control file 105.

A central processing unit (CPU) 110 generates an automatic reproduction control file 105 depending on the input from an operation key 111, controls the reading unit 106 or synchronizing control unit 109 on the basis of the information of the automatic reproduction control file 105, and controls reading of image file, decoding and reproduction of the file being read out in the decoder 108.

A display unit 112 is a display device such as a liquid crystal display device or cathode-ray tube (CRT) for displaying the image signal decoded by the decoder 108, and a speaker 113 is for reproducing the audio signal decoded by the decoder 108.

Figure 2:
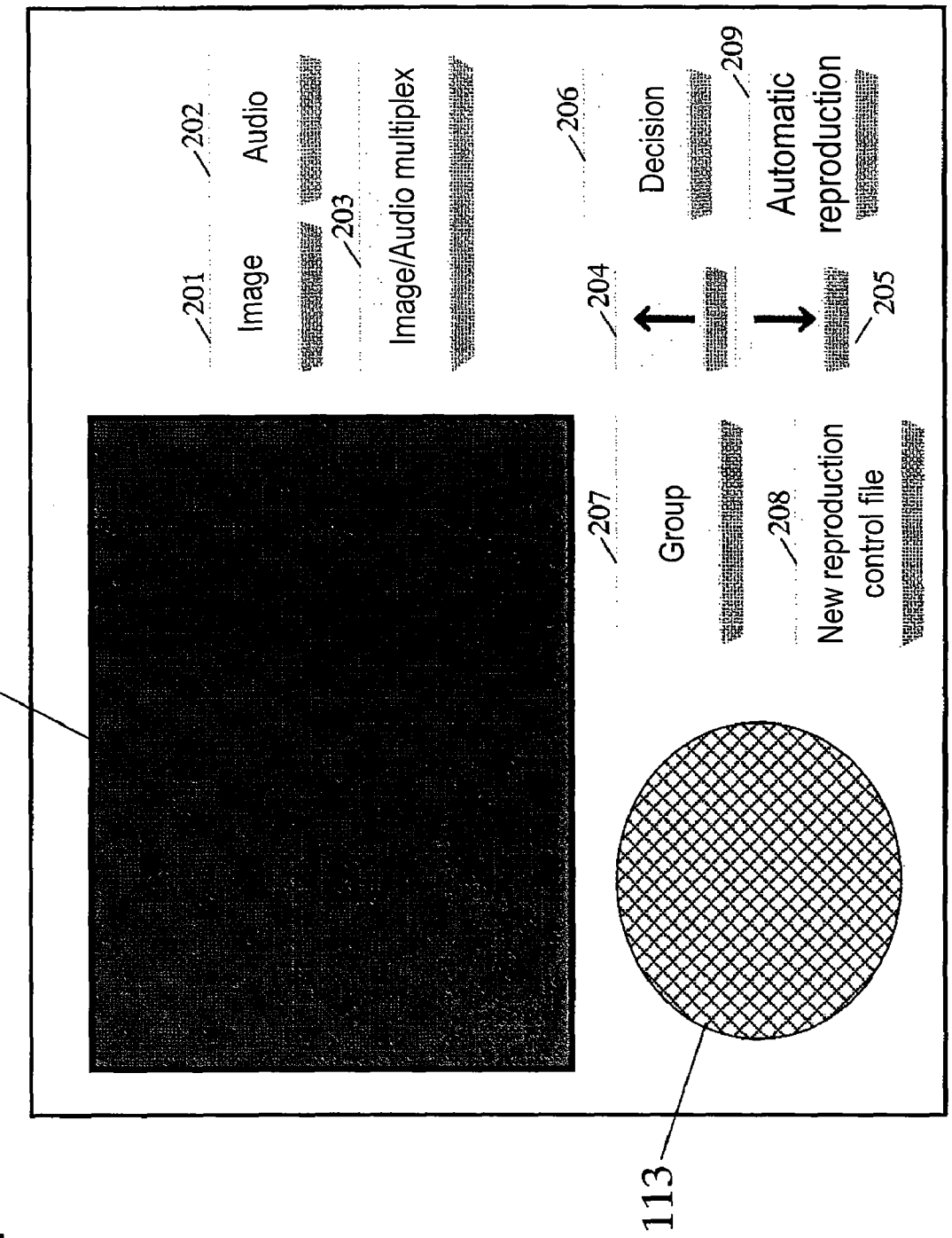
FIG. 2 is a layout diagram of operation panel of the image and audio reproducing apparatus in embodiments 1 to 4.

FIG. 2 is a layout diagram of operation panel of the image and audio reproducing apparatus in embodiments 1 to 4.

Keys 201 to 209 are keys for composing the operation key 111 shown in FIG. 1, and a key input signal is sent to the CPU 110 shown in FIG. 1. Principal functions of each key are as follows.

When a image file reproduction mode select key 201 is pressed, it results in reproduction mode of image file on the storage unit 101, and the CPU 110 controls the reading unit 106, reads out one of the image file and image/audio multiplex file recorded in the storage unit 101, and decodes by the decoder 108, so that the image of the file being read out is displayed in the display unit 112.

When an audio file reproduction mode select key 202 is pressed, it results in reproduction mode of audio file on the storage unit 101, and the CPU 110 controls the reading unit 106, reads out one of the audio file and image/audio multiplex file recorded in the storage unit 101, and decodes by the decoder 108, so that the audio of the file being read out is reproduced from the speaker 113.

When a image/audio multiplex file reproduction mode select key 203 is pressed, it results in reproduction mode of image/audio multiplex file on the storage unit 101, and the CPU 110 controls the reading unit 106, reads out one of the image/audio multiplex files recorded in the storage unit 101, and decodes by the decoder 108, so that the image of the file being read out is displayed in the display unit 112, while the sound is reproduced from the speaker 113.

A send key 204 is a key to be pressed while reproducing other file than the file being presently reproduced, and a return key 205 is a key for reproducing the file once reproduced immediately before. A decision key 206 is a key pressed when selecting the reproduced file as the object of automatic reproduction.

When a group key 207 is pressed, the CPU 110 provides a specific file group with a group ID number, and a file name is written in an automatic reproduction control file together with a specific character string.

When a new reproduction control file create key 208 is pressed, the CPU 110 controls the writing unit 107, and newly creates an automatic reproduction control file on the storage unit 101.

When an automatic reproduction key 209 is pressed, the CPU 110 controls the reading unit 106 and synchronization control unit 109 on the basis of the information of the automatic reproduction control file 105, and automatically reads out and reproduces the file on the storage unit 101.

Figure 3:
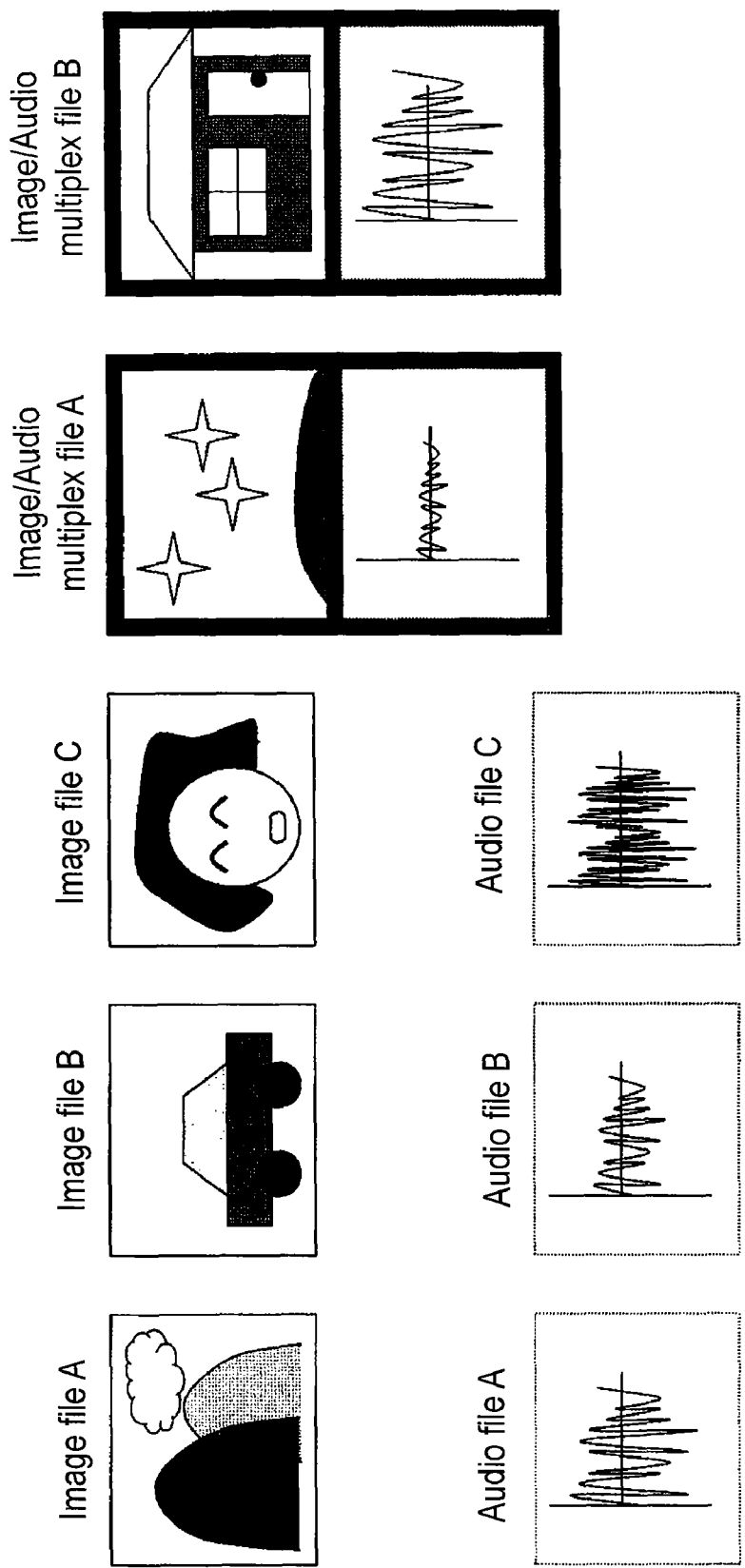
FIG. 3 is a schematic diagram of image file, audio file, and image/audio multiplex file stored in a storage unit in embodiments 1 to 4.

FIG. 3 is a schematic diagram of image file, audio file, and image/audio multiplex file stored in storage unit 101 in embodiments 1 to 4. In FIG. 3, image files A, B, C are files in which image data are stored. Audio files A, B, C are files in which audio data are stored. Image/audio multiplex files A, B are files in which image and audio data are multiplexed and stored in one file. In the following explanation, it is supposed that these eight files shown in FIG. 3 are recorded on the storage unit 101.

Concerning the embodiment having such configuration, the operation is explained below.

When the user reproduces the image file, audio file, and image/audio multiplex file recorded on the storage unit 101 by combining freely, first, an automatic reproduction control file 105 is created in the following procedure.

First, of the eight files shown in FIG. 3, if the user desires to reproduce the image portions of the image file B and image/audio multiplex file A continuously in this sequence as for the image, to reproduce the audio portions of the audio file A and image/audio multiplex file B continuously in this sequence as for the audio, and further to reproduce the audio file A synchronized with start of reproduction of image file B, the operation is explained by referring to the content of the automatic reproduction control file in FIG. 4.

To begin with, the user presses the new reproduction control file create key 208. Receiving this key input, editing of automatic reproduction control file is newly started, and the CPU 110 controls the writing unit 107, and creates a file in a file name of, for example, "AUTOPLY1" on the storage unit 101.

Next, the user presses the image file reproduction mode select key 201 in order to select the image to be reproduced automatically, and reproduces and displays the image file on the storage unit 101 in the display unit 112. At this time, for example, image file A is reproduced in the display unit 112, and by changing the display image by using the send key 204 or return key 205, the image file B, image file C, image portion of image/audio multiplex file A, and image portion of image/audio multiplex file B are supposed to be displayed sequentially. When the user desires to reproduce the image file B and image portion of image/audio multiplex file A continuously in this sequence, the user manipulates the send key 204 or return key 205, and displays the image file B to be reproduced in the first place in the display unit 112. Then the decision key 206 is pressed. The CPU 110 has a temporary memory for storing the information temporarily in its inside, and when the decision key 206 is pressed, the file name of the image file B is recorded in this temporary memory in succession to the character string "IMG_SRC=" for indicating that the user has selected this file as the image to be reproduced in the reproduction mode of the image file. Consequently, when the send key 204 or return key 205 is pressed, the image of the image/audio multiplex file A is displayed. The decision key 206 is pressed again. As a result, the file name of the audio/image multiplex file A is recorded in this temporary memory of the CPU 110 in succession to the character string "IMG_SRC=" similarly. In this procedure, the image file B and image/audio multiplex file A are selected, and the file names are recorded in the CPU 110 together with the character string "IMG_SRC=" in the desired sequence of reproduction.

Next, to select the audio to be reproduced automatically, the audio file reproduction mode select key 202 is pressed, and the audio vile on the storage unit 101 is reproduced from the speaker 113. At this time, in the speaker 113, for example, when the audio file A is reproduced, and by changing the audio to be reproduced by the send key 204 or return key 205, it is supposed that the audio file B, audio file C, audio portion of image/audio multiplex file A, and audio portion of image/audio multiplex file B are reproduced sequentially from the speaker 113. When the user desires to reproduce the audio file A and audio portion of image/audio multiplex file B continuously in this sequence, the user manipulates the send key 204 or return key 205, and reproduces the audio file A to be reproduced in the first place from the speaker 113. Then the decision key 206 is pressed. In the temporary memory of the CPU 110, the file name of the audio file A is recorded in succession to the character string "SND_SRC=" for indicating that the user has selected this file as the audio to be reproduced in the reproduction mode of the audio file. Consequently, when the send key 204 or return key 205 is pressed, the audio portion of the image/audio multiplex file B is reproduced. The decision key 206 is pressed again. As a result, the file name of the image/audio multiplex file B is recorded in the temporary memory of the CPU 110 in succession to the character string "SND_SRC=" similarly. In this procedure, the audio file A and image/audio multiplex file B are selected, and the file names are recorded in the CPU 110 together with the character string "SND_SRC=" in the desired sequence of reproduction.

In this state, consequently, when the group key 207 is pressed, the CPU 110 recognizes these selected image file B and image/audio multiplex file A, and audio file A and image/audio multiplex file B as one group, and provides with an original ID number (for example 001), and controls the writing unit 107, and write the group original ID number and the content stored in the temporary memory of the CPU 110 in the automatic reproduction control file "AUTOPLY1" on the storage unit 101. FIG. 4 shows the content of automatic reproduction control file "AUTOPLY1" written in this manner. In FIG. 4, "GID" is group ID number, and it is 001 in the example in FIG. 4. The character string "IMG_SRC" shows the image file or image portion of image/audio multiplex file, and it shows that the image file B and image portion of image/audio multiplex file A are the images selected by the user to be reproduced. The character string "SND_SRC" shows the audio file or audio portion of image/audio multiplex file, and it shows that the audio file A and audio portion of image/audio multiplex file B are the audios selected by the user to be reproduced. In particular, concerning the image/audio multiplex file, the image portion and audio portion can be separately designated by the character strings "IMG_SRC" and "SND_SRC", so that the image/audio multiplex file can be handled as a image file composed of image data only or an audio file composed of audio data only.

Of these files indicated by "IMG_SRC" and "SND_SRC", the file of the smaller number of lines is the file to be reproduced first in time.

This is the procedure of creating the automatic reproduction control file 105. Next, reproduction of file on the basis of the automatic reproduction control file 105 shown in FIG. 4 is explained.

When the user presses the automatic reproduction key 209, the CPU 110 controls the reading unit 106, reads out the automatic reproduction control file 105, and acquires its content. The CPU 110 searches for the GID from the first line of the automatic reproduction control file 105, and recognizes from the first GID to just before next GID as one group. The final group in the automatic reproduction control file 105 is from the final GID to the final line of the file. In this embodiment, there is only one group, that is, one group is formed from the first GID to the final line of the automatic reproduction control file 105.

The automatic reproduction control file 105 includes file names in the sequence of reproduction. The image file or the image portion of image/audio multiplex file is designated by character string "IMG_SRC", and the audio file or the audio portion of image/audio multiplex file is designated by character string "SND_SRC". Accordingly, the CPU 110 judges whether the object file relates to image reproduction or to audio reproduction by checking the character string. As a result, as for the image, the image file B and the image portion of image/audio multiplex file A are read out in this sequence from the storage unit 101, and as for the sound, the audio file A and the audio portion of image/audio multiplex file B are read out, and decoded and reproduced. At this time, from the description of the first line of the automatic reproduction control file 105, these files are judged to be one group identified with the same group ID, and the synchronization control unit 109 control decoding of the decoder 108 so as to synchronize start of reproduction of image file B to be reproduced first among the image files included in the group and start of reproduction of audio file A to be reproduced first among the audio files included in the same group.

Specifically, the CPU 110 sends the information showing the image and audio to be reproduced synchronously to the synchronization control unit 109. The decoder 108 has a temporary memory for storing the decoded result provisionally within itself, and decodes the file being read out from the storage unit 101, and once writes into the temporary memory sequentially. This is the means for compensating for time error if difference occurs in the time of decoding depending on the files. The synchronization control unit 109 monitors the progress of decoding of picture and sound to be reproduced synchronously, and when decoded completely until it is ready to reproduce the picture and sound simultaneously, the picture and sound stored in the temporary memory are reproduced at the same time. Thus, the image reproduction and audio reproduction are synchronized.

Figure 5:
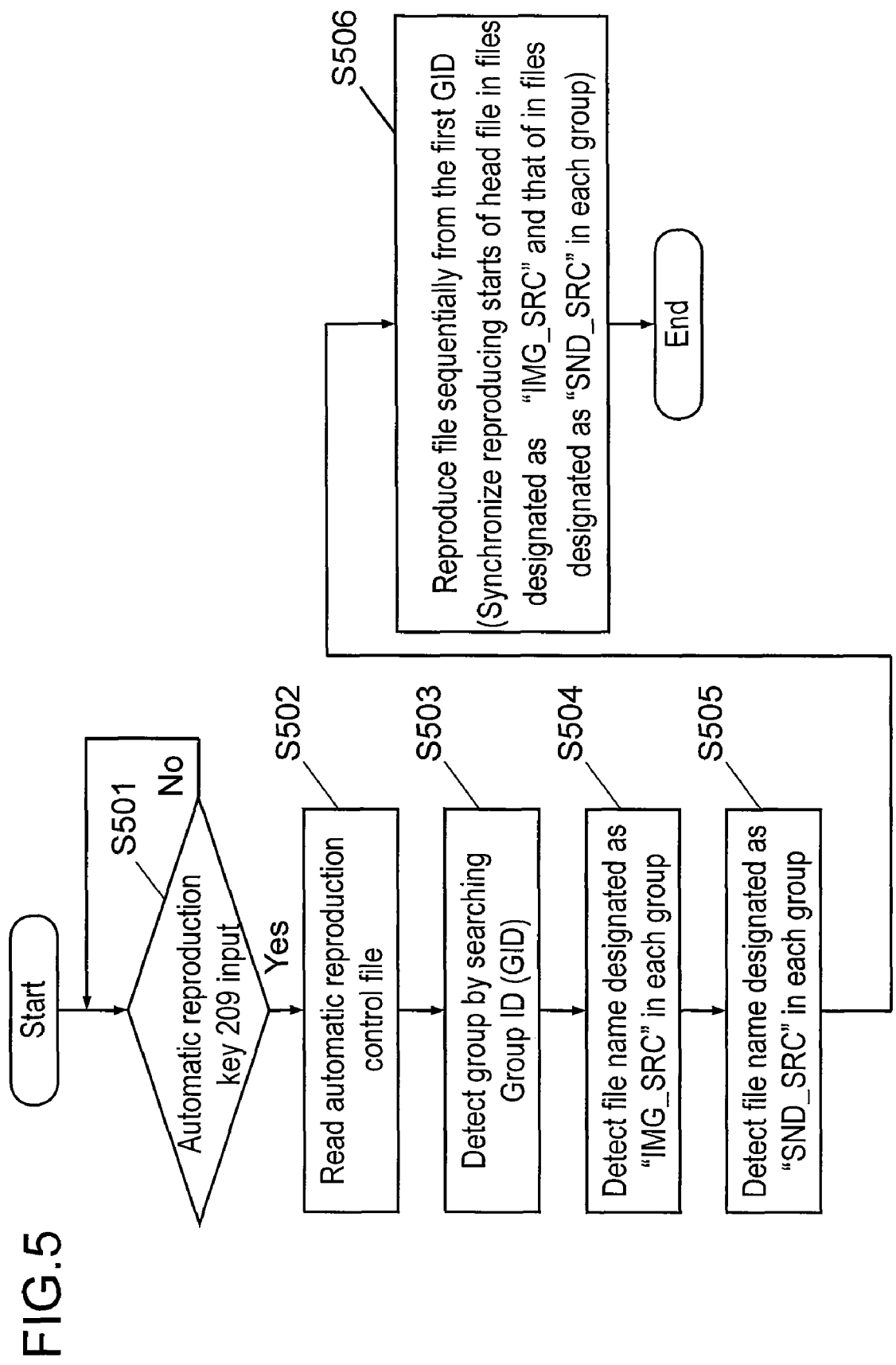
FIG. 5 is a flowchart of automatic reproduction operation in embodiment 1.

This series of flow of reproduction of files is shown in a flowchart in FIG. 5. In FIG. 5, step 501 is to wait for input from the automatic reproduction key 209, and when the automatic reproduction key 209 is pressed, the process goes to step 502. At step 502, the CPU 110 controls the reading unit 106, and reads out the automatic reproduction control file 105 from the storage unit 101. At step 503, the CPU 110 searches for group ID number from the automatic reproduction control file 105 being read out, and detects the group. Further, at step 504, in every detected group, the file name designated by character string "IMG_SRC" indicating the image is detected, and at step 505, similarly, the file name designated by character string "SND_SRC" indicating the sound is detected. Step 506, as explained above, is to control reading of file from the storage unit 101, decoding by the decoder 108, and synchronized reproduction of picture and sound by the synchronization control unit 109.

Figure 6:
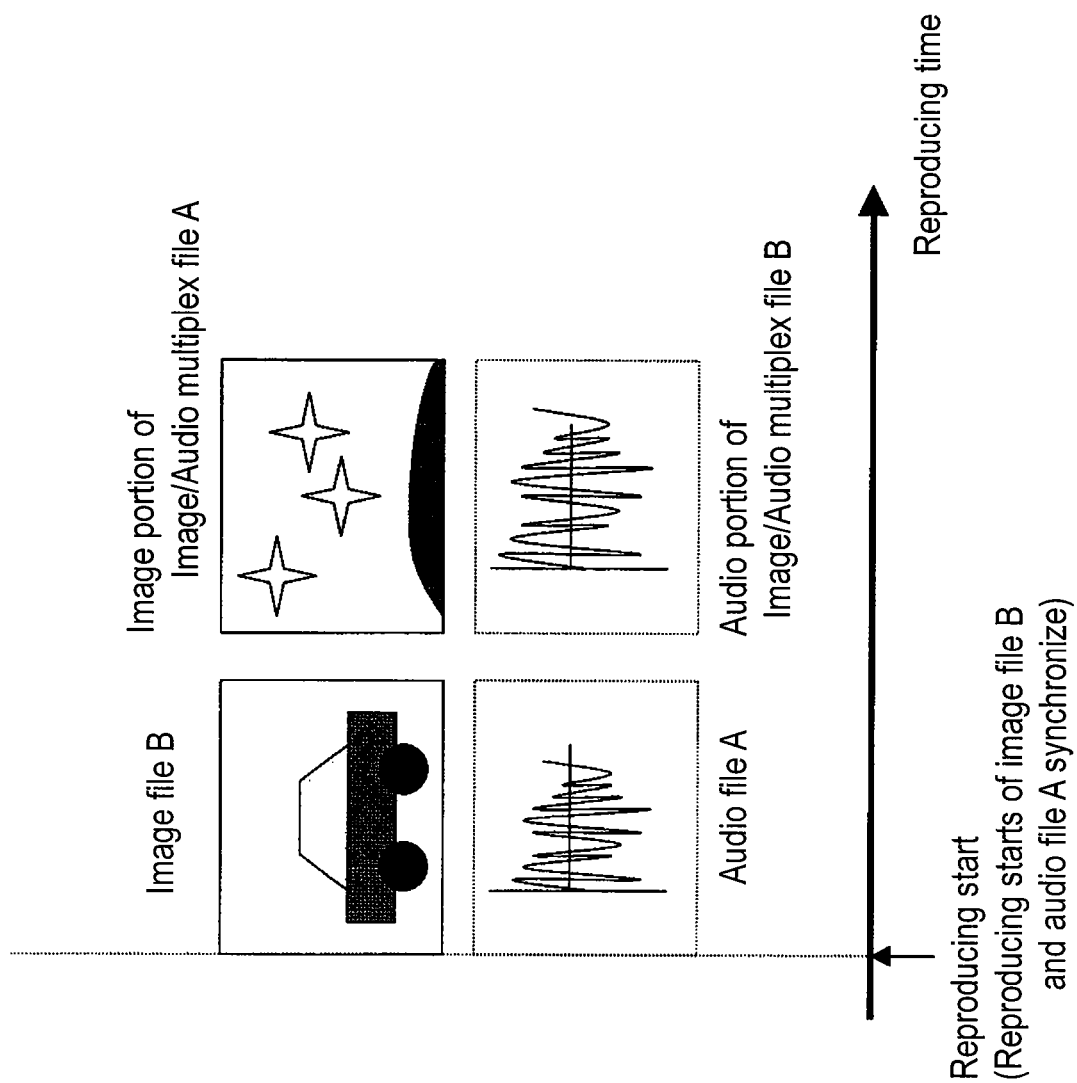
FIG. 6 is an explanatory diagram of image and audio reproduced automatically in embodiment 1.

Such reproduction of image and audio is schematically shown in FIG. 6. That is, the picture is reproduced in the sequence of image file B and image portion of image/audio multiplex file A, and synchronously with start of reproduction of image file B, audio file A is reproduced and then audio portion of image/audio multiplex file B is reproduced. Thus, the image and audio can be reproduced as designated by the user.

According to the embodiment, the image file and audio file to be reproduced synchronously are specified in a group form in the automatic reproduction control file 105 as shown in FIG. 4. According to this automatic reproduction control file 105, reading of file from the storage unit 101 and decoding by the decoder 108 are controlled so as to synchronize start of reproduction of image file to be reproduced first among the image files included in the group and start of reproduction of audio file to be reproduced first among the audio files included in the same group. Therefore, the image data, audio data, and image and audio multiplexed data can be freely and easily combined by the user, and the desired image and audio can be reproduced synchronously.

(Embodiment 2)

In embodiment 1 of the invention, a group consisting of plural files is described in the automatic reproduction control file 105, and in this case, the image and audio can be synchronized only at the start point of reproduction of the files included in the group, and next image and audio may not be always synchronized. A further synchronized reproduction in detail of image and audio may be considered. An embodiment assuming such case is explained by referring to FIG. 7 showing the content of automatic reproduction control file. The configuration of the image and audio reproducing apparatus of the embodiment is the same as shown in the block diagram in FIG. 1, and the layout of the operation panel of the image and audio reproducing apparatus is the same as shown in FIG. 2, and the explanation is omitted.

For example, among the files shown in FIG. 3, image file A and image file B are reproduced in this sequence, and start of reproduction of image file A and audio file B is synchronized, and further start of reproduction of image file B and audio portion of image/audio multiplex file B is synchronized, and in this case, first, the automatic reproduction control file 105 is created in the following procedure.

To begin with, the user presses the new reproduction control file create key 208 in the same way as in the case of embodiment 1. As a result, a file in a file name of, for example, "AUTOPLY2" is created on the storage unit 101.

Next, the user presses the image file reproduction mode select key 201 for selecting the image to be reproduced automatically, and the image file on the storage unit 101 is reproduced and displayed in the display unit 112, and the display image is changed by the send key 204 or return key 205, and the image file A is displayed. Then the decision key 206 is pressed. As a result, in succession to the character string "IMG_SRC=", the file name of the image file A is recorded in the temporary memory of the CPU 110. Further, to select the audio to be reproduced automatically, the audio file reproduction mode select key 202 is pressed, and the audio file on the storage unit 101 is reproduced from the speaker 113, and the reproduction audio is changed by the send key 204 or return key 205, and the audio file B is reproduced. Then the decision key 206 is pressed. As a result, in succession to the character string "SND_SRC=", the file name of the audio file B is recorded in the temporary memory of the CPU 110.

In this state, when the group key 207 is pressed, the CPU 110 recognizes these selected image file A and audio file B as one group, and provides with an original ID number (for example 001), and controls the writing unit 107, and writes the group original ID number and the content stored in the temporary memory of the CPU 110 in the automatic reproduction control file "AUTOPLY2" on the storage unit 101.

In the same way as mentioned above, the image file B and audio portion of image/audio multiplex file B are reproduced and selected, and the group key 207 is pressed. As a result, the CPU 110 recognizes the image file B and audio portion of image/audio multiplex file B as one group, and provides with an original ID number (for example 002). It further controls the writing unit 107, and writes the group original ID number and the content stored in the temporary memory of the CPU 110 in the automatic reproduction control file "AUTOPLY2" on the storage unit 101. FIG. 7 shows the content of the created automatic reproduction control file "AUTOPLY2". In FIG. 7, "GID" is group ID number, and in the example in FIG. 7, ID numbers are given to two groups. In the same manner as in FIG. 4, the character string "IMG_SRC" shows the image file or image portion of image/audio multiplex file, and the character string "SND_SRC" shows the audio file or audio portion of image/audio multiplex file. Of these file groups, the file group having the GID of the smaller number of lines is the file group to be reproduced first in time.

This is the procedure of creating the automatic reproduction control file 105. Next, reproduction of file on the basis of the automatic reproduction control file 105 shown in FIG. 7 is explained.

Figure 8:
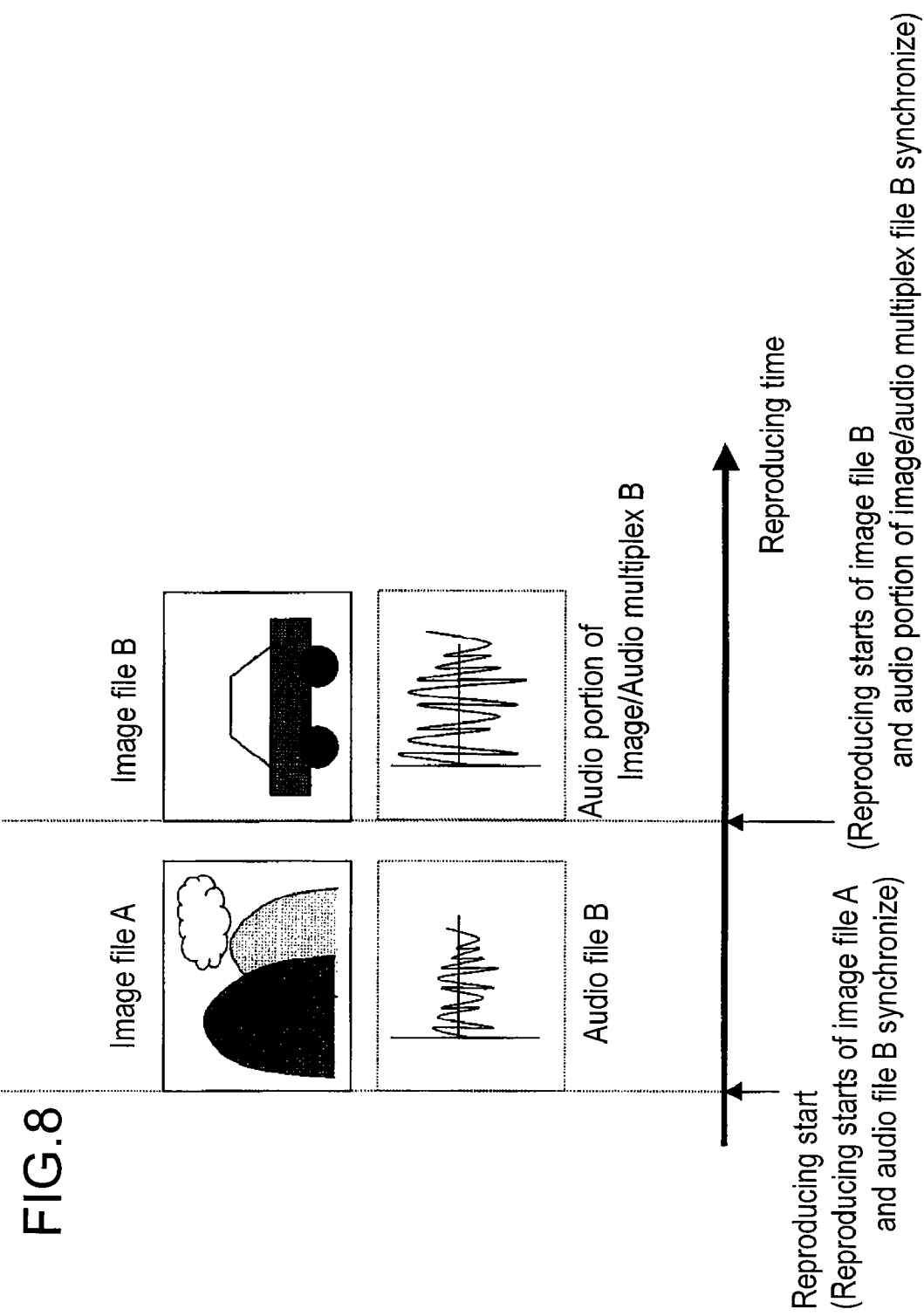
FIG. 8 is an explanatory diagram of image and audio reproduced automatically in embodiment 2.

When the user presses the automatic reproduction key 209, the CPU 110 controls the reading unit 106, reads out the automatic reproduction control file 105, and acquires its content. The CPU 110 searches for the GID from the first line of the automatic reproduction control file 105, and recognizes from the first GID to just before next GID as one group. The final group in the automatic reproduction control file 105 is from the final GID to the final line of the file. From the description of the automatic reproduction control file 105, image file A and audio file B are recognized as one group, and image file B and audio portion of image/audio multiplex file B as one group. The image is decoded and reproduced by reading out the image file A and image file B in this sequence from the storage unit 101, and the audio is similarly decoded and reproduced by reading out the audio file B and audio portion of image/audio multiplex file B in this sequence from the storage unit 101. At this time, since the image file A and audio file B form one group, and the image file B and audio portion of image/audio multiplex file B form one group, decoding by the decoder 108 is controlled by the synchronization control unit 109 so as to synchronize start of reproduction of image file A and start of reproduction of audio file B, and start of reproduction of image file B and start of reproduction of audio portion of image/audio multiplex file B. The flowchart of this series of reproduction of files is the same as in embodiment 1 of the invention shown in FIG. 5. Such reproduction of image and audio is schematically shown in FIG. 8, and the user can reproduce the image and audio freely as designated.

Thus, according to embodiment 2, a plurality of groups consisting of plural files each are placed in one automatic reproduction control file, and reproduction of image and audio can be synchronized in detail, and therefore the image data, audio data, and image and audio multiplexed data can be freely and easily combined by the user, and the image and audio can be reproduced synchronously.

(Embodiment 3)

In embodiments 1 and 2 of the invention, plural files in the automatic reproduction control file 105 are provided with a group ID number, and plural files are regarded as one group, and the image and audio are reproduced synchronously. In these examples, the image/audio multiplex file is divided into image portion and audio portion, and recorded in the automatic reproduction control file 105 in such divided state. However, the image/audio multiplex file taken by a digital still camera or digital image camera is a file recording image and audio at the same time, and therefore the image and audio are recorded synchronously in this file. When reproducing such file, if it is recorded in the automatic reproduction control file by once dividing into image portion and audio portion, it is not only complicated for the user, but also it may cause confusion.

Accordingly, in this embodiment, the image/audio multiplex file is reproduced from the automatic reproduction control file while maintaining the synchronized relation of image and audio without separating into image portion and audio portion, and this is explained by referring to FIG. 9 showing the content of automatic reproduction control file. The configuration of the image and audio reproducing apparatus of the embodiment is the same as shown in the block diagram in FIG. 1, and the layout of the operation panel of the image and audio reproducing apparatus is the same as shown in FIG. 2, and the explanation is omitted.

For example, among the files shown in FIG. 3, if the user desires to reproduce image/audio multiplex file A and image/audio multiplex file B continuously in this sequence, the automatic reproduction control file is created in the following procedure.

To begin with, the user presses the new reproduction control file create key 208 in the same way as in the case of embodiment 1. As a result, a file in a file name of, for example, "AUTOPLY3" is created on the storage unit 101.

Next, the user presses the image/audio multiplex file reproduction mode select key 203 for selecting the image/audio multiplex file to be reproduced automatically, and the image/audio multiplex file on the storage unit 101 is reproduced. The reproduction file is changed by using the send key 204 or return key 205, and the image/audio multiplex file A is reproduced, and then decision key 206 is pressed. As a result, the file name of image/audio multiplex file A is recorded in the temporary memory of the CPU 110, in succession to the character string "CMP_SRC=" which indicates that the user has selected this file as the image and audio multiplexed file to be reproduced in the reproduction mode of the image/audio multiplex file. Similarly, the image/audio multiplex file B is reproduced, and the decision key 206 is pressed, and then, in succession to the character string "CMP_SRC=", the file name of the image/audio multiplex file B is recorded in the temporary memory of the CPU 110. In this procedure, image/audio multiplex file A and image/audio multiplex file B are selected, and the file names are stored in the CPU 110, in the desired sequence of reproduction, together with the character string "CMP_SRC=".

In this state, when the group key 207 is pressed, the CPU 110 recognizes these selected image/audio multiplex file A and image/audio multiplex file B as one group, and provides with an original ID number (for example 001). Further it controls the writing unit 107, and writes the group original ID number and the content stored in the temporary memory of the CPU 110 in the automatic reproduction control file "AUTOPLY3" on the storage unit 101. FIG. 9 shows the content of the created automatic reproduction control file "AUTOPLY3". In FIG. 9, "GID" is group ID number, and "CMP_SRC" is a character string showing a image/audio multiplex file, which shows that the image/audio multiplex files A and B are data selected by the user as the picture and sound to be reproduced. Of these file groups, the file group having the GID of the smaller number of lines is the file group to be reproduced first in time.

This is the procedure of creating the automatic reproduction control file 105. Next, reproduction of file on the basis of the automatic reproduction control file 105 shown in FIG. 9 is explained.

When the user presses the automatic reproduction key 209, the CPU 110 controls the reading unit 106, reads out the automatic reproduction control file 105, and acquires its content. The automatic reproduction control file 105 includes the file names in the sequence of reproduction. The image/audio multiplex file is designated by the character string "CMP_SRC", and it is judged from this character string that the object file is a file multiplexing and recording image and audio. As a result, image/audio multiplex file A and image/audio multiplex file B are read out from the storage unit 101 and decoded by the decoder 108, and image and audio are reproduced synchronously.

Specifically, the CPU 110 sends the information showing the files to be reproduced synchronously to the synchronization control unit 109. The decoder 108 has a temporary memory for storing the decoded result provisionally in its inside, and decodes the file being read out from the storage unit 101, and once writes into the temporary memory sequentially. This is the means for compensating for time error if difference occurs in the time of decoding between the image portion and audio portion in the image/audio multiplex file. The synchronization control unit 109 monitors the progress of decoding of image and audio to be reproduced, and when decoded completely until it is ready to reproduce the picture and sound simultaneously, the image and audio stored in the temporary memory are reproduced at the same time. Thus, the image reproduction and audio reproduction are synchronized.

Figure 10:
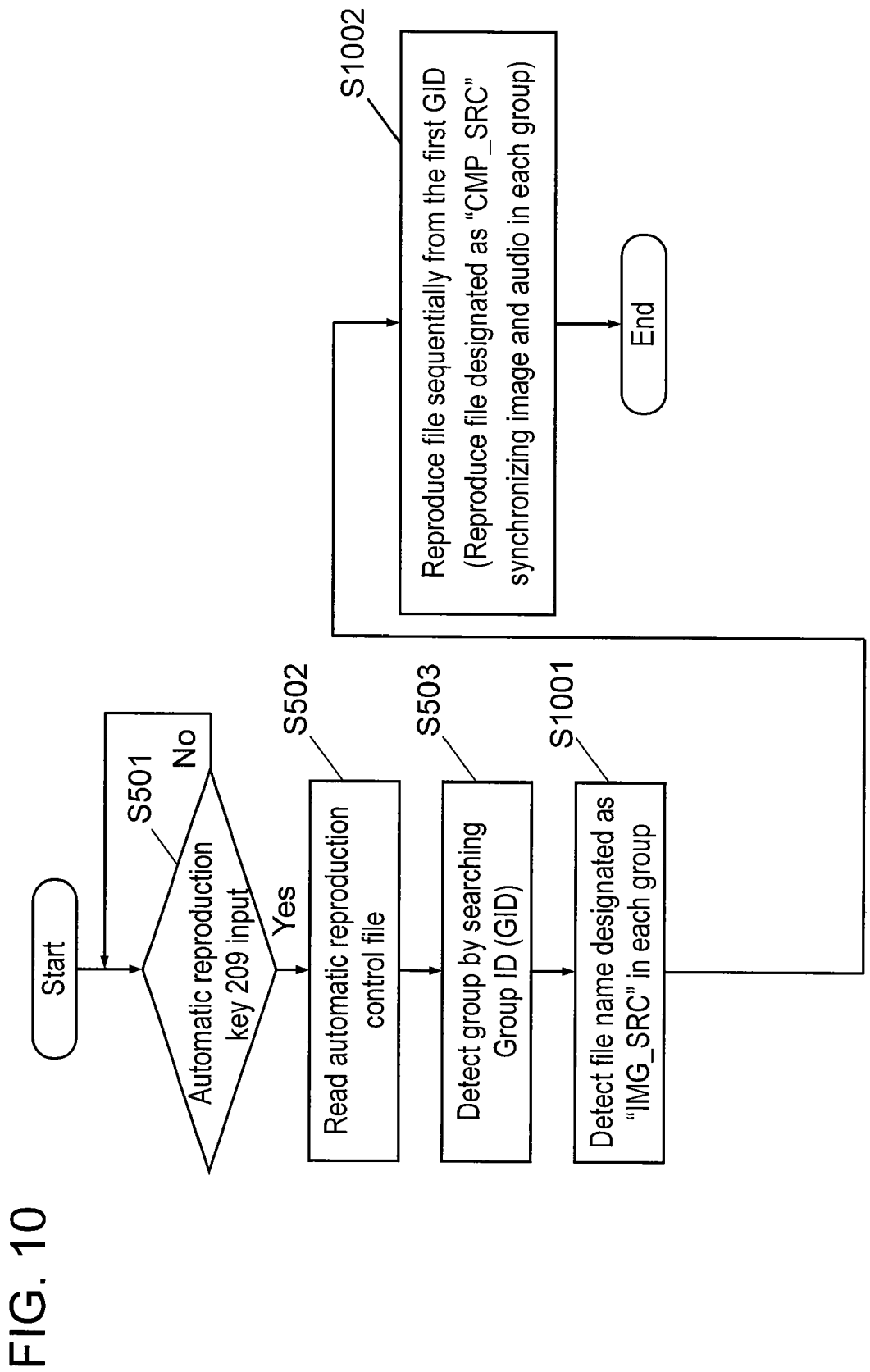
FIG. 10 is a flowchart of automatic reproduction operation in embodiment 3.

This series of flow of reproduction of files is shown in a flowchart in FIG. 10. In FIG. 10, step 501 through step 503 are the same as in FIG. 5, and are not explained herein. Step 1001 is for detecting the file name designated by the character string "CMP_SRC" showing the image in every detected group. At step 1002, the CPU 110 reads out the designated image/audio multiplex files from the storage unit 101 sequentially from the earlier group ID number, and controls decoding by the decoder 108 and synchronized reproduction of image and audio by the synchronization control unit 109.

Figure 11:
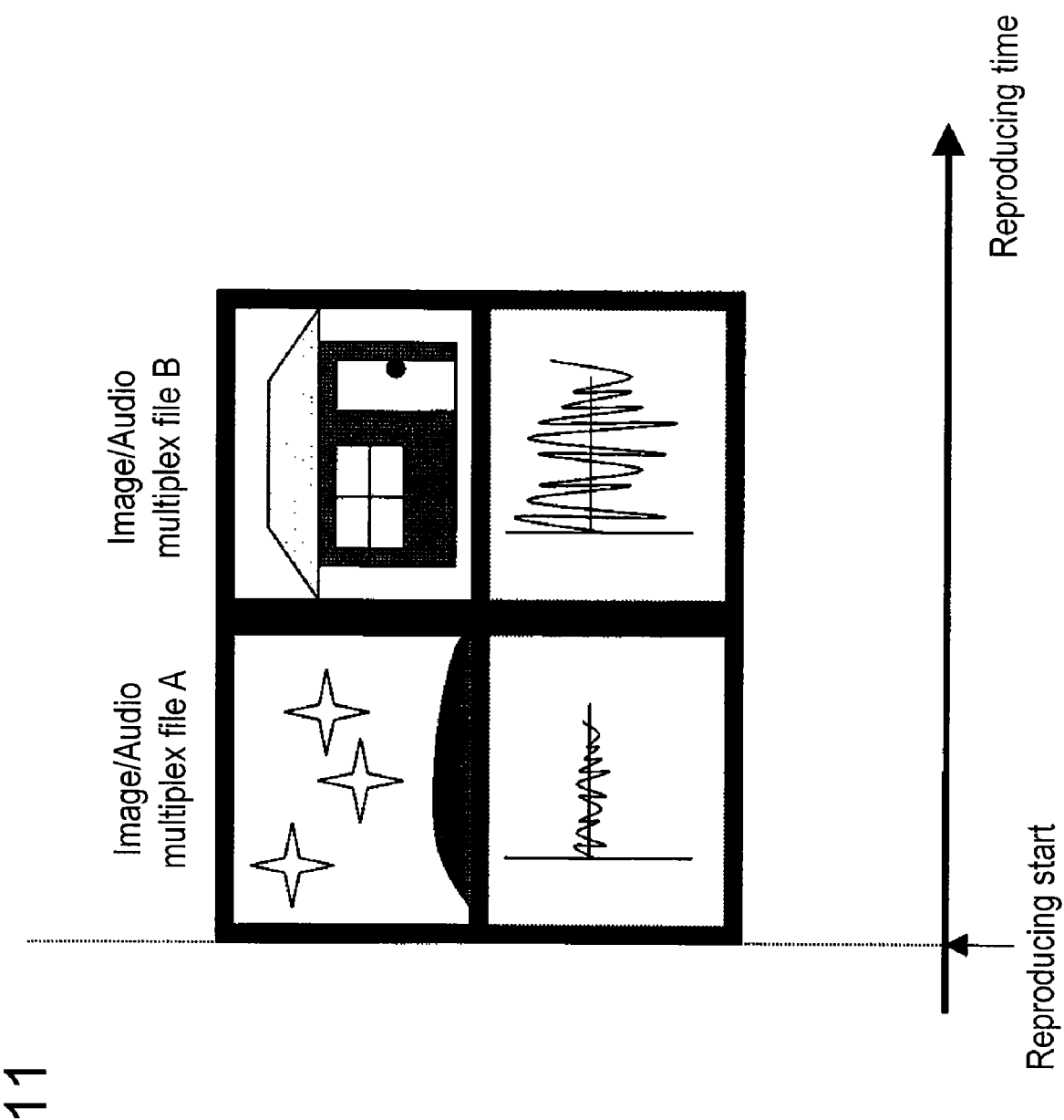
FIG. 11 is an explanatory diagram of image and audio reproduced automatically in embodiment 3.

Such reproduction of image and audio is schematically shown in FIG. 11, and the user can reproduce the image and audio as designated.

Thus, according to embodiment 3, the image and audio multiplexed data is not divided into image portion and audio portion, and while maintaining the synchronized state of image and audio, the user can freely and easily combine, and reproduce the image and audio synchronously.

(Embodiment 4)

In embodiment 3 of the invention, a group consisting of image/audio multiplex files only is described in the automatic reproduction control file 105, and an example of automatic reproduction is explained. In this embodiment, the user reproduces automatically including image file and audio file, and it is explained by referring to FIG. 12 showing the content of the automatic reproduction control file. The configuration of the image and audio reproducing apparatus of the embodiment is the same as shown in the block diagram in FIG. 1, and the layout of the operation panel of the image and audio reproducing apparatus is the same as shown in FIG. 2, and the explanation is omitted.

For example, among the files shown in FIG. 3, the user desires to reproduce image file B, image/audio multiplex file B, and image file C in this sequence, and at this time, start of reproduction of image file B and audio file A is synchronized, the image portion of the image/audio multiplex file B is synchronized with the audio portion of the same file, and further start of reproduction of image file C and audio portion of image/audio multiplex file A is synchronized, and in this case, first, the automatic reproduction control file is created in the following procedure.

To begin with, the user presses the new reproduction control filecreate key 208 in the same way as in the case of embodiment 1. As a result, a file in a file name of, for example, "AUTOPLY4" is created on the storage unit 101.

Next, the user presses the image file reproduction mode select key 201 for selecting the image to be reproduced automatically, and the image file on the storage unit 101 is reproduced and displayed in the display unit 112, and the display image is changed by the send key 204 or return key 205, and the image file B is displayed. Then the decision key 206 is pressed. As a result, the file name of image file B is recorded in the temporary memory of the CPU 110, in succession to the character string "IMG_SRC=" which indicates that the user has selected this file as the image to be reproduced in the reproduction mode of the image file. Further, to select the audio to be reproduced automatically, the audio file reproduction mode select key 202 is pressed, and the audio file on the storage unit 101 is reproduced from the speaker 113, and the reproduction audio is changed by the send key 204 or return key 205, and the audio file A is reproduced. Then the decision key 206 is pressed. As a result, the file name of the audio file A is recorded in the temporary memory of the CPU 110, in succession to the character string "SND_SRC=" which indicates that the user has selected this file as the audio to be reproduced in the reproduction mode of the audio file.

In this state, when the group key 207 is pressed, the CPU 110 recognizes these selected image file B and audio file A as one group, and provides with an original ID number (for example 001), and controls the writing unit 107, and writes the group original ID number and the content stored in the temporary memory of the CPU 110 in the automatic reproduction control file "AUTOPLY4" on the storage unit 101.

Next, to select the image/audio multiplex file to be reproduced automatically, the image/audio multiplex file reproduction mode select key 203 is pressed, and the image/audio multiplex file on the storage unit 101 is reproduced. The display image is changed by using the send key 204 or return key 205, and the image/audio multiplex file B is reproduced, and then decision key 206 is pressed. As a result, the file name of image/audio multiplex file B is recorded in the temporary memory of the CPU 110, in succession to the character string "CMP_SRC=" which indicates that the user has selected this file as the image and audio multiplexed file to be reproduced in the reproduction mode of the image/audio multiplex file.

In this state, when the group key 207 is pressed, the CPU 110 recognizes the selected image/audio multiplex file B as one group, and provides with an original ID number (for example 002), and controls the writing unit 107, and writes the group original ID number and the content stored in the temporary memory of the CPU 110 in the automatic reproduction control file "AUTOPLY4" on the storage unit 101.

Again, to select the image to be reproduced automatically, the image file reproduction mode select key 201 is pressed, and the image file on the storage unit 101 is reproduced and displayed in the display unit 112, and the display image is changed by using the send key 204 or return key 205, and the image file C is displayed, and then decision key 206 is pressed. As a result, the file name of image file C is recorded in the temporary memory of the CPU 110, in succession to the character string "IMG_SRC=". Further, to select the audio to be reproduced automatically, the audio file reproduction mode select key 202 is pressed, and the audio file on the storage unit 101 is reproduced from the speaker 113, and the reproduction audio is changed by using the send key 204 or return key 205, and the audio portion of the image/audio multiplex file A is reproduced, Then the decision key 206 is pressed. As a result, the file name of image/audio multiplex file A is recorded in the temporary memory of the CPU 110, in succession to the character string "SND_SRC=".

In this state, when the group key 207 is pressed, the CPU 110 recognizes the selected image file C and audio portion of image/audio multiplex file A as one group, and provides with an original ID number (for example 003), and controls the writing unit 107, and writes the group original ID number and the content stored in the temporary memory of the CPU 110 in the automatic reproduction control file "AUTOPLY4" on the storage unit 101. FIG. 12 shows the content of the written automatic reproduction control file "AUTOPLY4". In FIG. 12, "GID" is group ID number, three groups are individually provided with group ID numbers in the example in FIG. 12. In the same manner as in FIG. 4, "IMG_SRC" is a character string showing a image file or image portion of image/audio multiplex file, "SND_SRC" is a character string showing an audio file or audio portion of image/audio multiplex file, and, in the same manner as in FIG. 9, "CMP_SRC" is a character string showing a image/audio multiplex file. Of these file groups, the file group having the GID of the smaller number of lines is the file group to be reproduced first in time, and within a group, of the files indicated by character strings "IMG_SRC" and others, the file having the smaller number of lines indicated by the same character string is to be reproduced first.

This is the procedure of creating the automatic reproduction control file 105. Next, reproduction of file on the basis of the automatic reproduction control file 105 shown in FIG. 12 is explained.

When the user presses the automatic reproduction key 209, the CPU 110 controls the reading unit 106, reads out the automatic reproduction control file 105, and acquires its content. The CPU 110 searches for the GID from the first line of the automatic reproduction control file, and recognizes from the first GID to just before next GID as one group. The final group in the automatic reproduction control file 105 is from the final GID to the final line of the file. From the description of the automatic reproduction control file 105, image file B and audio file A are recognized as one group, image/audio multiplex file B as one group, and image file C and audio portion of image/audio multiplex file A as one group. From the storage unit 101, image file B, audio file A, image/audio multiplex file B, image file C, and audio portion of image/audio multiplex file A are read out, decoded by the decoder 108, and reproduced. At this time, the image file B and audio file A form one group, image/audio multiplex file B is one group, and image file C and audio portion of image/audio multiplex file A form one group. Accordingly, as shown in the explanatory diagram in FIG. 14, decoding by the decoder 108 is controlled by the synchronization control unit 109 in the follow manner: reproduction of image file B and reproduction of audio file A are started synchronously, the image portion and audio portion of image/audio multiplex file B are reproduced synchronously, and finally start of reproduction of image file C and start of reproduction of audio portion of image/audio multiplex file A are synchronized. This series of flow of reproduction of files is shown in a flowchart in FIG. 13.

Figure 13:
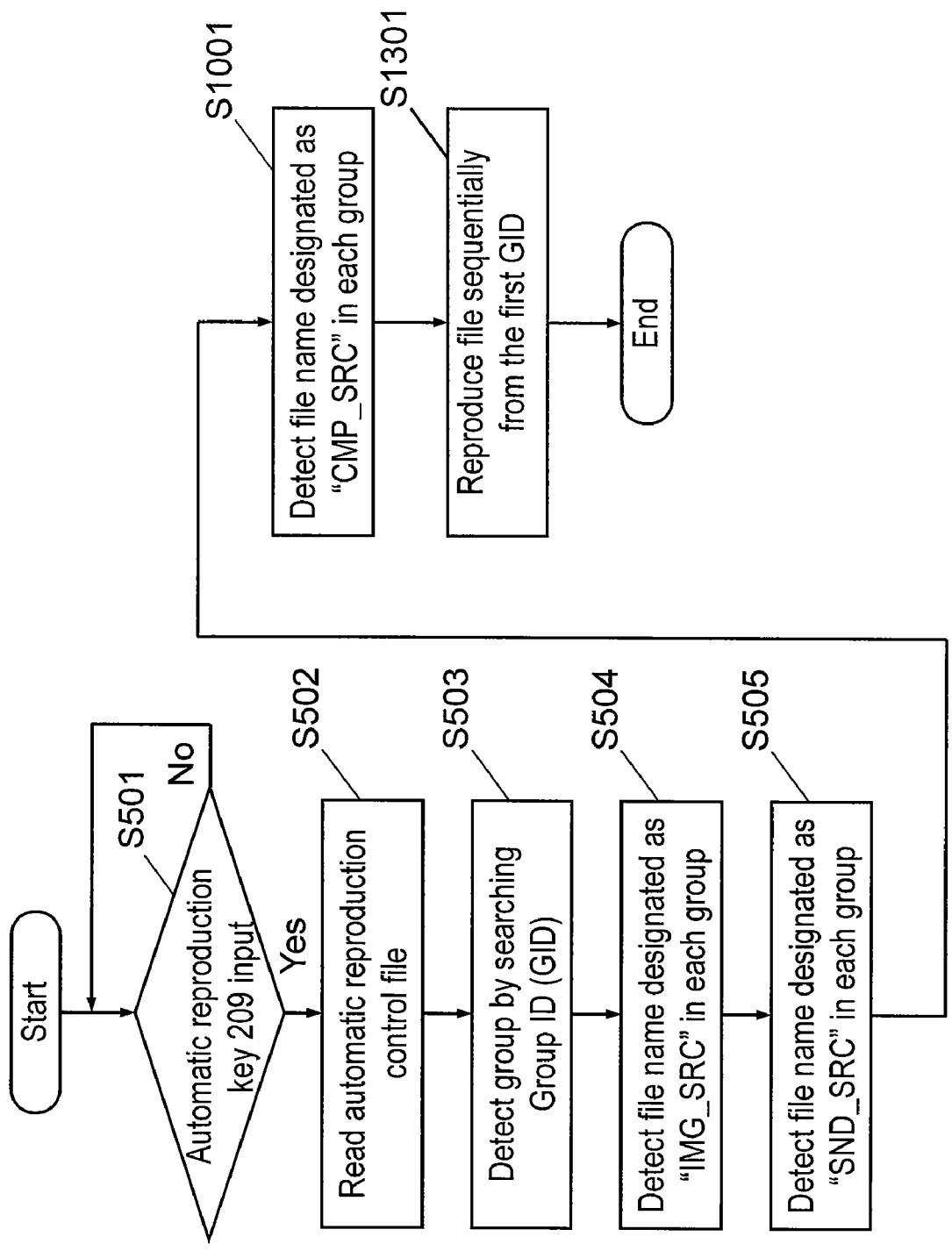
FIG. 13 is a flowchart of automatic reproduction operation in embodiment 4.

In FIG. 13, step 501 through step 505 are the same as in FIG. 5, and step 1001 is the same as in FIG. 10, and hence they are not explained herein. Step 1301 is for reproducing the files in every detected group, and as explained in embodiments 1 to 3 of the invention, the CPU 110 controls reading of file from the storage unit 101, decoding by the decoder 108, and synchronized reproduction of image and audio by the synchronization control unit 109.

Thus, the user can reproduce the image and audio exactly as designated by user's own.

According to embodiment 4, in the case of automatic reproduction of image and audio by combining three types of files, that is, image file, audio file, and image/audio multiplex file, the image and audio can be reproduced synchronously by freely and easily combing the three types of files by the user, without dividing the image and audio multiplexed data into image portion and audio portion, in the format maintaining the synchronized relation of image and audio, or, as required, by dividing into image portion and audio portion.

In embodiment 4 of the invention, when grouping files, an image/audio multiplex file designated by character string "CMP_SRC" and files designated by character strings "IMG_SRC" and "SND_SRC" are not mixed. That is, when placing a image/audio multiplex file designated by character string "CMP_SRC" in one group, one group is formed by a image/audio multiplex file designated by character string "CMP_SRC" only. For example, in FIG. 12, in the group of which GID is 002, only the image/audio multiplex file designated by character string "CMP_SRC" is included. The reason for such definition is explained below.

Figure 15:
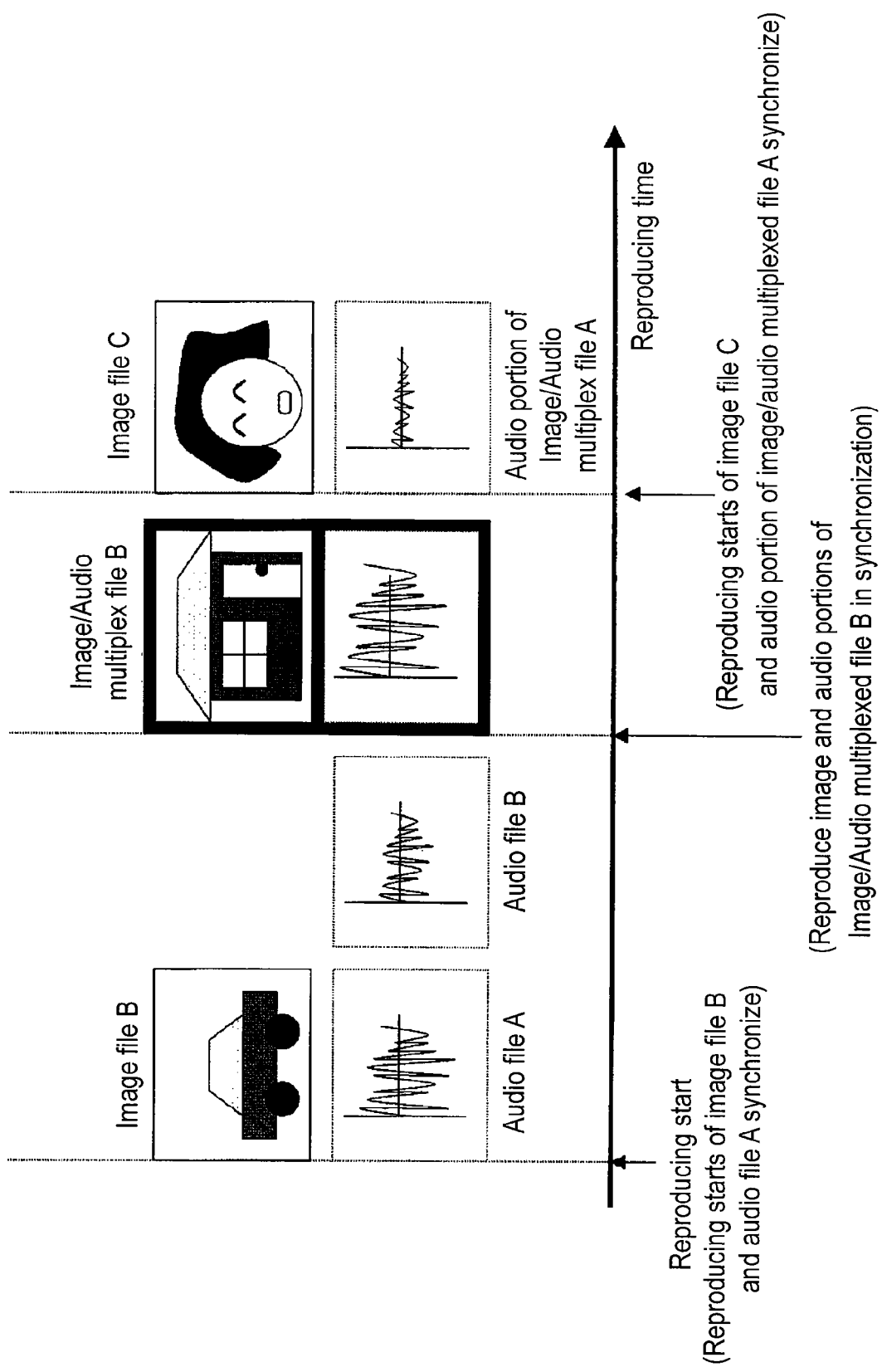
FIG. 15 is an explanatory diagram of example of writing method of file designated by character string "CMP_SRC" in group in embodiment 4.

Suppose, for example as shown in FIG. 15, to start reproduction of image file B and audio file A synchronously, reproduce audio file A and then audio file B, and reproduce the image and audio of the audio/image multiplex file B synchronously, and finally reproduce the image file C and audio portion of the image/audio multiplex file A synchronously. In this case, as an example of creating an automatic reproduction control file, the following procedure is considered as explained above. First, by pressing the new reproduction control file create key 208, editing of automatic reproduction control file 105 is started, and after displaying the image file B in the display unit 112 by manipulating the image file reproduction mode select key 201, send key 204, and return key 205, this file name is stored in the CPU 110 in succession to the character string "IMG_SRC" by the decision key 206. Next, similarly, by manipulating the image/audio multiplex file reproduction mode select key 203, send key 204, and return key 205, the image/audio multiplex file B is reproduced, and this file name is stored in the CPU 110 in succession to the character string "CMP_SRC" by the decision key 206. Again, by manipulating the image file reproduction mode select key 201, send key 204, and return key 205, the image file C is displayed in the display unit 112, and this file name is stored in the CPU 110 in succession to the character string "IMG_SRC" by the decision key 206. As a result, the file names to be reproduced are stored in the temporary memory of the CPU 110 in the sequence of image file B, image/audio multiplex file B, and image file C.

Concerning the audio files, in the desired sequence of reproduction, audio file A, audio file B, and audio portion of image/audio multiplex file A are reproduced from the speaker 113 by manipulating the audio file reproduction mode select key 202, send key 204, and return key 205, and these file names are stored in the CPU 110 in succession to the character string "SND_SRC" by the decision key 206. By pressing the group key 207, the selected files are formed as a group, and it is written into the automatic reproduction control file together with the group ID number (for example, 001).

The automatic reproduction control file 105 created in this procedure is shown in FIG. 16. In this automatic reproduction control file 105, six files are formed as a group by one group ID (GID) as shown in FIG. 16.

Next, suppose to reproduce plural files automatically by the automatic reproduction control file 105.

In the automatic reproduction control file 105 in FIG. 16, image file B, image/audio multiplex file B, and image file C are arranged in this order, and it is known that the images are reproduced in the same sequence. As for the audio files, audio file A, audio file B, and audio portion of image/audio multiplex file A are reproduced in this sequence, and it is also known that the audio files are reproduced so as to synchronize start of reproduction of the image file to be reproduced first among the image files included in the group and start of reproduction of the audio file to be reproduced first among the audio files included in the same group, that is, to synchronize start of reproduction of image file B and start of reproduction of audio file A. However, the timely sequence of the audio portion of image/audio multiplex file B, audio file B, and audio portion of image/audio multiplex file A cannot be judged from the description of the automatic reproduction control file 105 in FIG. 16. Specifically, the audio file A to be synchronized with the image file B to be reproduced before the image/audio multiplex file B must be reproduced before the audio portion of image/audio multiplex file B, but nothing is judged from the automatic reproduction control file in FIG. 16 except that the audio file B and audio portion of image/audio multiplex file A are reproduced after audio file A.

Accordingly, if the automatic reproduction control file is created in the same procedure as explained so far, the information for specifying the timely sequence of the audio portion of image/audio multiplex file B, audio file B, and audio portion of image/audio multiplex file A must be added to the automatic reproduction control file. In this case, the description in the automatic reproduction file is complicated, and the apparatus for reproducing the image and audio automatically on the basis of this automatic reproduction control file requires a heavy burden for analyzing the automatic reproduction control file. Specifically, the reproducing apparatus is required to have hardware or software for more complicated analysis of automatic reproduction control file. It also adds to time and labor for creating the automatic reproduction control file, which means a heavier burden for the user.

Figure 14:
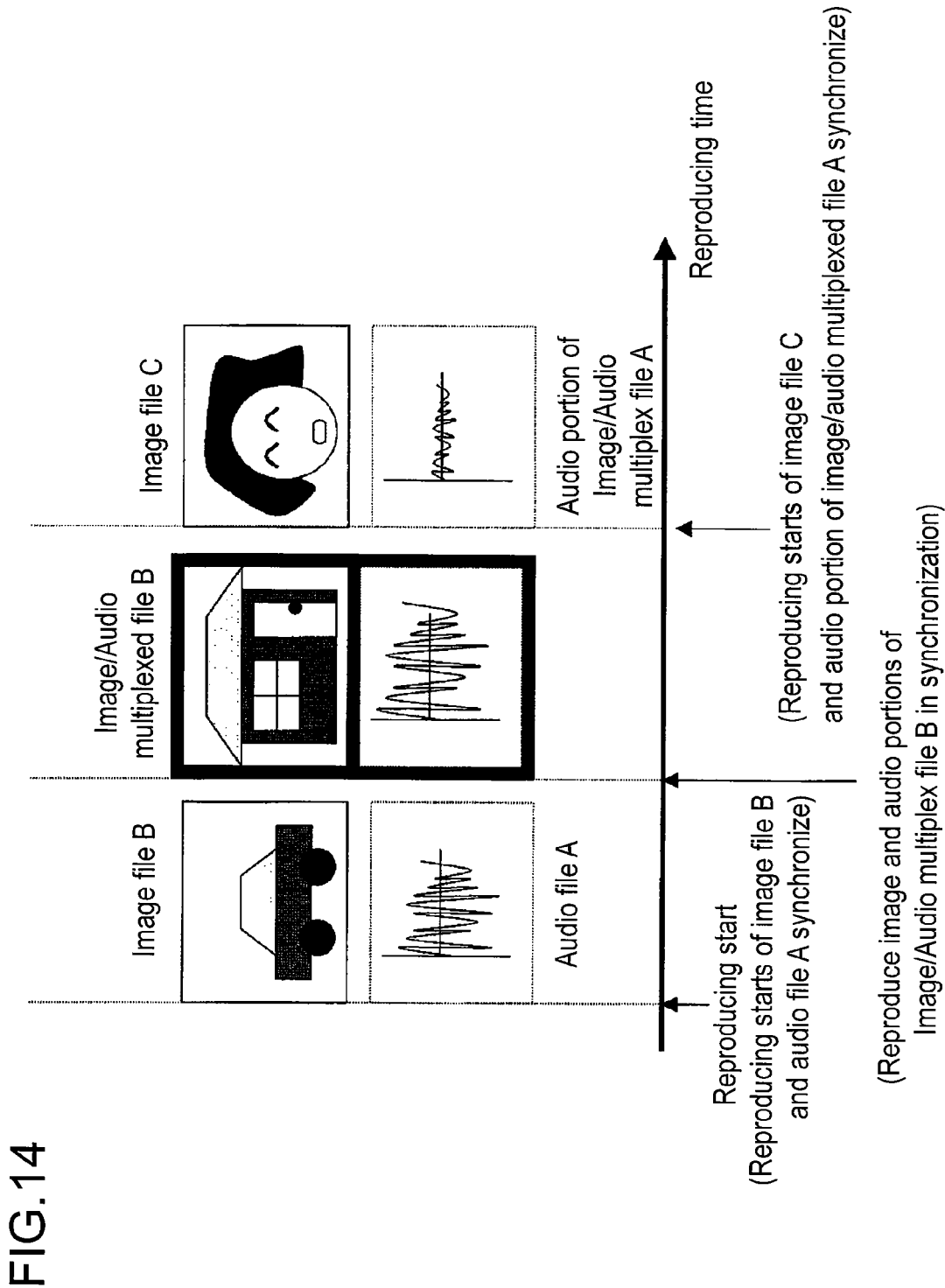
FIG. 14 is an explanatory diagram of image and audio reproduced automatically in embodiment 4.

Accordingly, as shown in FIG. 12 and FIG. 14, when designating the image/audio multiplex file by character string "CMP_SRC" to be handled as one file reproducing image and audio synchronously, without mixing with the files designated by character strings "IMG_SRC" and "SND_SRC", one group is composed of only one image/audio multiplex file designated by character string "CMP_SRC". That is, in the case of the file in which the synchronized relation of image and audio is complete within one file, in the nature of the file, such as an image/audio multiplex file, by including the files having the same format as one group, the timely sequence of files is not unclear if the automatic reproduction control file is composed together with other file not having synchronized relation of image and audio.

As clear from embodiment 3 of the invention, it is no problem if a plurality of files designated by "CMP_SRC" are placed in one group.

Thus, by defining the file creating method in such manner, it is not necessary to add the information for specifying the timely sequence of audio file or audio portion of image/audio multiplex file to the automatic reproduction control file, and by a simple description of the automatic reproduction control file, the timely sequence of files can be clearly defined. Therefore without adding to the load for analysis of automatic reproduction control file in the apparatus for reproducing image and audio automatically, the user is free to create automatic reproduction control file without any extra burden.

As an example of automatic reproduction control file for reproducing image and audio in the synchronized relation as shown in FIG. 15, a case as shown in FIG. 17 may be also considered. As shown in FIG. 17, the portion showing reproduction of image/audio multiplex file B is supposed to be GID=002, and when it is separated from the GID designating other file, it is evident from the explanation so far that the timely sequence of the files can be clearly defined.

By mistake, if the user creates an automatic reproduction control file including the file designated by character string "CMP_SRC", and files designated by character strings "IMG_SRC" and "SND_SRC" in the same group, such wrong operation is indicated by error message in the display unit 112, so that the user may be instructed to create the automatic reproduction control file correctly.

(Embodiment 5)

In embodiments 1 to 4 of the invention, by describing a group consisting of plural files in the automatic reproduction control file 105, three types of files of image file, audio file, and image/audio multiplex file are combined, and image and audio are produced synchronously. A next example relates to reproduction by rearranging the group described in the automatic reproduction control file 105.

Figure 18:
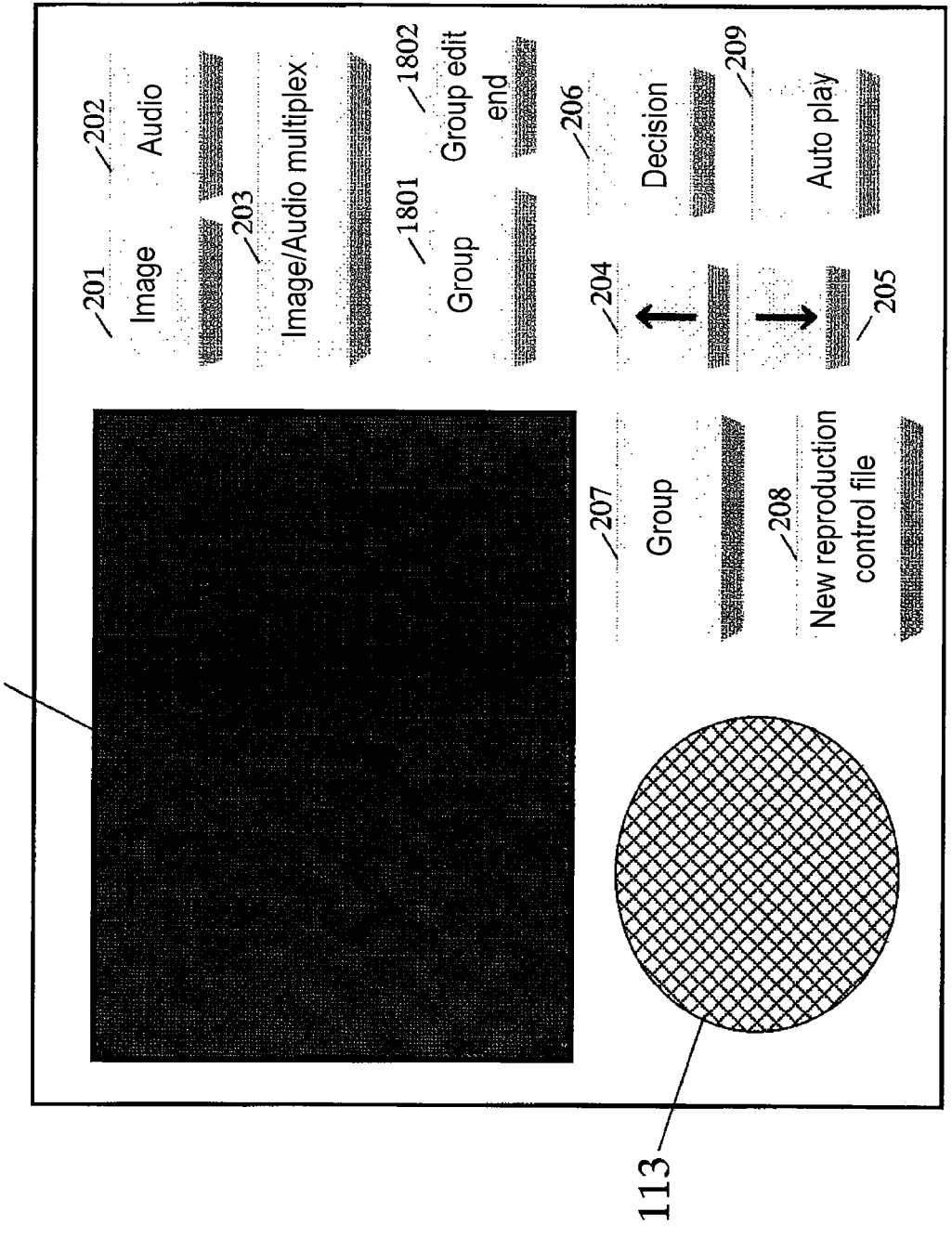
FIG. 18 is a layout diagram of operation panel of the image and audio reproducing apparatus in embodiment 5.

The configuration of the image and audio reproducing apparatus of embodiment 5 is the same as shown in the block diagram in FIG. 1, and the explanation is omitted. FIG. 18 is a layout diagram of the operation panel of the image and audio reproducing apparatus in embodiment 5 of the invention. The difference from the layout shown in FIG. 2 is that a group reproduction mode select key 1801 and a group edit end key 1802 are newly provided in FIG. 18. The display unit 112 and speaker 113 are the same as in FIG. 2.

The keys 201 to 209 are the same as in the image and audio reproducing apparatus in FIG. 2, and the same explanation is omitted. The principal functions of the group reproduction mode select key 1801 and the group edit end key 1802 are as follows.

When the group reproduction mode select key 1801 is pressed, the operation is set in the mode of reproducing the image and audio in each group described in the automatic reproduction control file 105 on the storage unit 101, and the CPU 110 controls the reading unit 106 according to the description of the automatic reproduction control file 105, and reads out the image file, audio file, and image/audio multiplex file recorded in the storage unit 101, and reproduces the image and audio in the group unit. The group edit end key 1802 is a key for terminating the rearrangement of the group.

In embodiment 5 of the invention having such configuration, the operation is explained below by referring also to FIG. 19 showing the content of automatic reproduction control file.

For example, suppose the file shown in FIG. 3, and automatic reproduction control file "AUTOPLY4" having the content shown in FIG. 12 as used in explanation of embodiment 4 of the invention are stored in the storage unit 101. In this case, suppose to reproduce by inverting the sequence of reproduction of the group of group ID number 001 (a group consisting of image file B and audio file A) and the group of group ID number 003 (a group consisting of image file C and audio portion of image/audio multiplex file A). In this case, first of all, a new automatic reproduction control file is created in the following procedure.

To begin with, the user presses the new reproduction control file create key 208 in the same way as in the case of embodiment 1 of the invention. As a result, a file in a file name of, for example, "AUTOPLY5" is created on the storage unit 101.

Next, the user presses the group reproduction mode select key 1801 for selecting the group to be reproduced automatically, and the image and audio are reproduced in each group described in the automatic reproduction control file. At this time, for example, if plural automatic reproduction control files are stored on the storage unit 101, in embodiment 5 of the invention, the automatic reproduction control file to be referred to after pressing the group reproduction mode select key 1801 is supposed to be "AUTOPLY4", and it is supposed that the grouped image and audio are reproduced according to the description of "AUTOPLY4" by pressing of the group reproduction mode select key 1801. After pressing of the group reproduction mode select key 1801, the group consisting of image file B and audio file A is reproduced by the display unit 112 and speaker 113, and the reproduction object is changed by the send key 204 or return key 205. As a result, the group consisting of image and audio portions of image/audio multiplex file B, and the group consisting of image file C and audio portion of image/audio multiplex file A are reproduced.

Suppose the user wishes to reproduce first the image file C and audio portion of image/audio multiplex file A, and the image and audio portions of the image/audio multiplex file B, and finally image file B and audio file A. In this case, by using the send key 204 or return key 205, first the group consisting of image file C and audio portion of image/audio multiplex file A is reproduced. Then the decision key 206 is pressed. The CPU 110, as the decision key 206 is pressed, stores the group ID number of the reproduced group, and character string and file name described in the group in the temporary memory. That is, the description from line 6 to line 8 in FIG. 12 is directly stored in the temporary memory.

Next, the second group desired to be reproduced, that is, the group consisting of image and audio portions of the image/audio multiplex file B is reproduced in the same procedure, and the decision key 206 is pressed, and then the group ID number of the reproduced group, and character string and file name described in the group are stored in the temporary memory. That is, the description from line 4 to line 5 in FIG. 12 is directly stored in the temporary memory. The final group, that is, the group consisting of image file B and audio file A is reproduced in the same procedure, and the decision key 206 is pressed, and then the group ID number of the reproduced group, and character string and file name described in the group are stored in the temporary memory. That is, the description from line 1 to line 3 in FIG. 12 is directly stored in the temporary memory.

In this state, when the group edit end key 1802 is pressed, the CPU 110 controls the writing unit 107, and writes the content stored in the temporary memory of the CPU 110 into the automatic reproduction control file "AUTOPLY5" on the storage unit 101. At this time, the group ID number (GID) is newly assigned from the earlier number of line.

For example, the first group ID number is 001, the second group ID number is 002, and the final group ID number is 003. FIG. 19 shows the content of the written automatic reproduction control file "AUTOPLY5". In FIG. 19, GID is the group ID number, and in the example in FIG. 19, three groups shown in FIG. 12 are changed in the sequence and assigned with new GID numbers.

Figure 20:
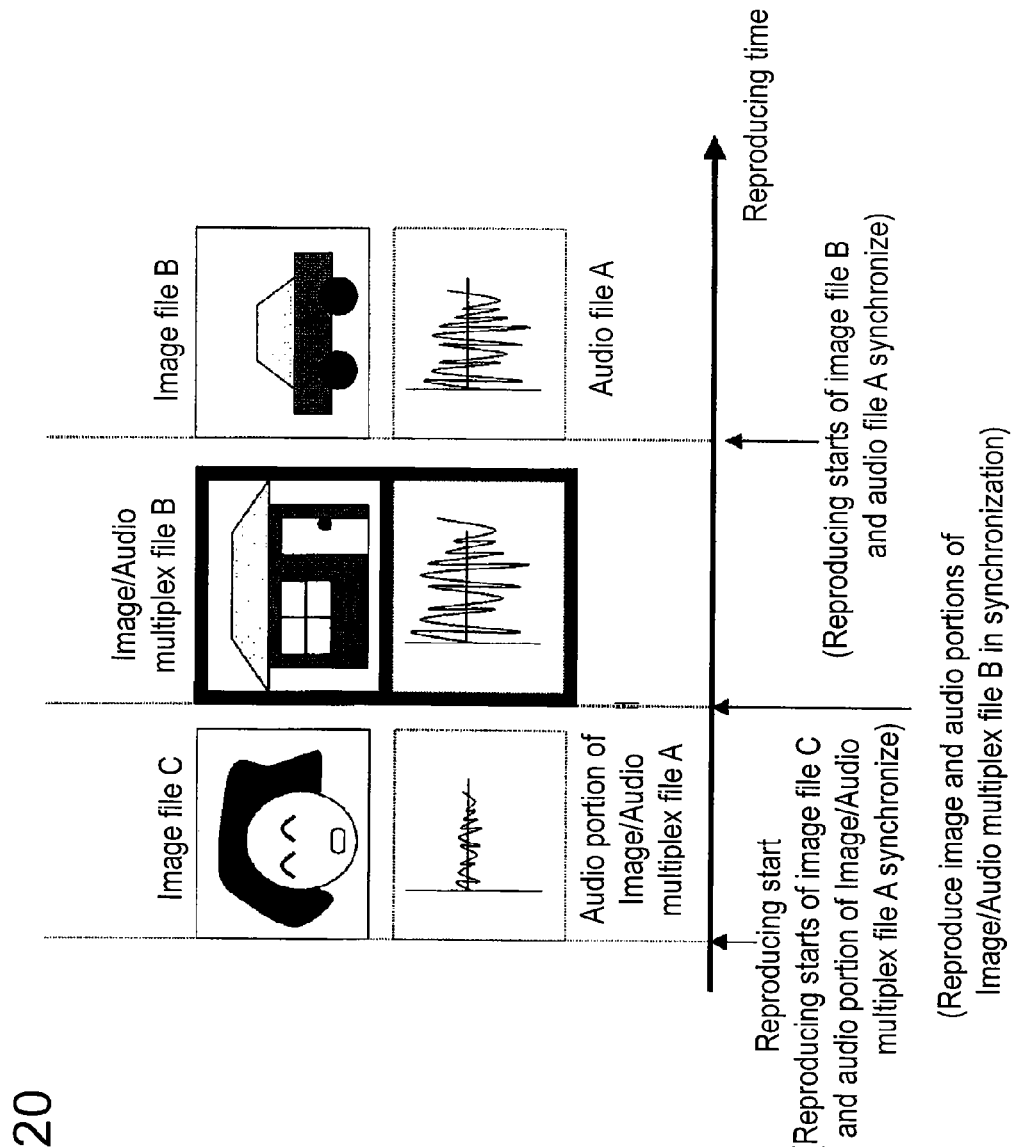
FIG. 20 is an explanatory diagram of image and audio reproduced automatically in embodiment 5.

This is the procedure of creating the automatic reproduction control file "AUTOPLY5". By using the automatic reproduction control file "AUTOPLY5" thus created, image and audio reproduction is started in synchronized state in each group, as shown in embodiment 4 of the invention. At this time, in the reproduction using the automatic reproduction control file "AUTOPLY5", the image and audio can be reproduced in a different sequence from the case of automatic reproduction control file "AUTOPLY4" shown in embodiment 4 of the invention. The mode of image and audio reproduction by using the automatic reproduction control file "AUTOPLY5" is schematically shown in FIG. 20.

Thus, according to embodiment 5 of the invention, when reproducing image and audio automatically by combining three types of files, that is, image file, audio file, and image/audio multiplex file, the groups described in the automatic reproduction control file 105 can be freely changed in order and reproduced.

Figure 21:
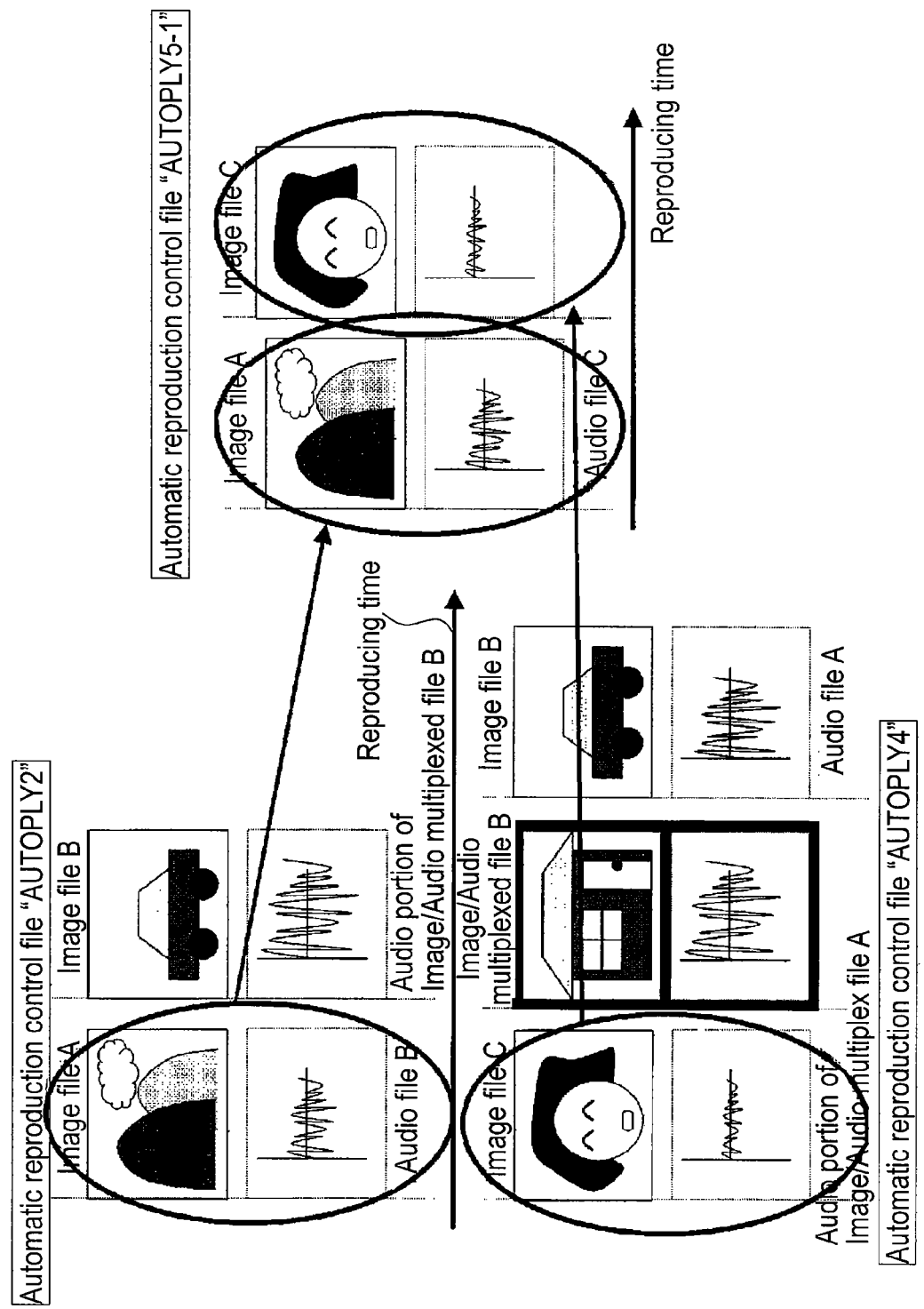
FIG. 21 is an explanatory diagram of concept of editing method of a new automatic reproduction control file from plural automatic reproduction control files in embodiment 5.

In embodiment 5 of the invention, the automatic reproduction control file to be referred to after pressing the group reproduction mode select key 1801 is "AUTOPLY4", but not limited to this, for example, if there are plural automatic reproduction control files on the memory 101, the user can arbitrarily select a desired automatic reproduction control file to be reproduced automatically. In this case, the groups described in plural automatic reproduction control files can be rearranged, and a new automatic reproduction control file can be created. For example, a function may be added for selecting a plurality of automatic reproduction control files to be referred to in reproduction after pressing of the group reproduction mode select key 1801, and in each group described in these plural automatic reproduction control files, the image and audio are reproduced by using the keys in the same procedure as mentioned above, and a desired file for automatic reproduction is selected by pressing the decision key 206, and a new automatic reproduction control file (for example, "AUTOPLY5-1") may be edited. For example, as shown in FIG. 21, the groups described in the automatic reproduction control files "AUTOPLY2" and "AUTOPLY5" explained above may be reconstructed with the group consisting of image file A and audio file B described in "AUTOPLY2" shown in FIG. 7, and the group consisting of image file C and audio portion of image/audio multiplex file A described in "AUTOPLY5" shown in FIG. 19, and an automatic reproduction control file "AUTOPLY5-1" is newly edited, and the image and audio are reproduced by using the "AUTOPLY5". Thus, as shown in FIG. 21, by editing two automatic reproduction control files, a new automatic reproduction control file can be created.

(Embodiment 6)

The image and audio reproducing apparatus explained so far can reproduce the image and audio according to the content of the automatic reproduction control file, but in the apparatus not having such automatic reproduction function, as a matter of course, such image and audio reproduction cannot be executed. Accordingly, when the image and audio to be reproduced automatically are converted into other versatile format, they can be reproduced in other apparatus. In embodiment 6 of the invention, therefore, it is proposed to newly create a data file capable of obtaining the same reproduction result as the result of reproduction of image and audio according to the description of the automatic reproduction control file 105.

Figure 22:
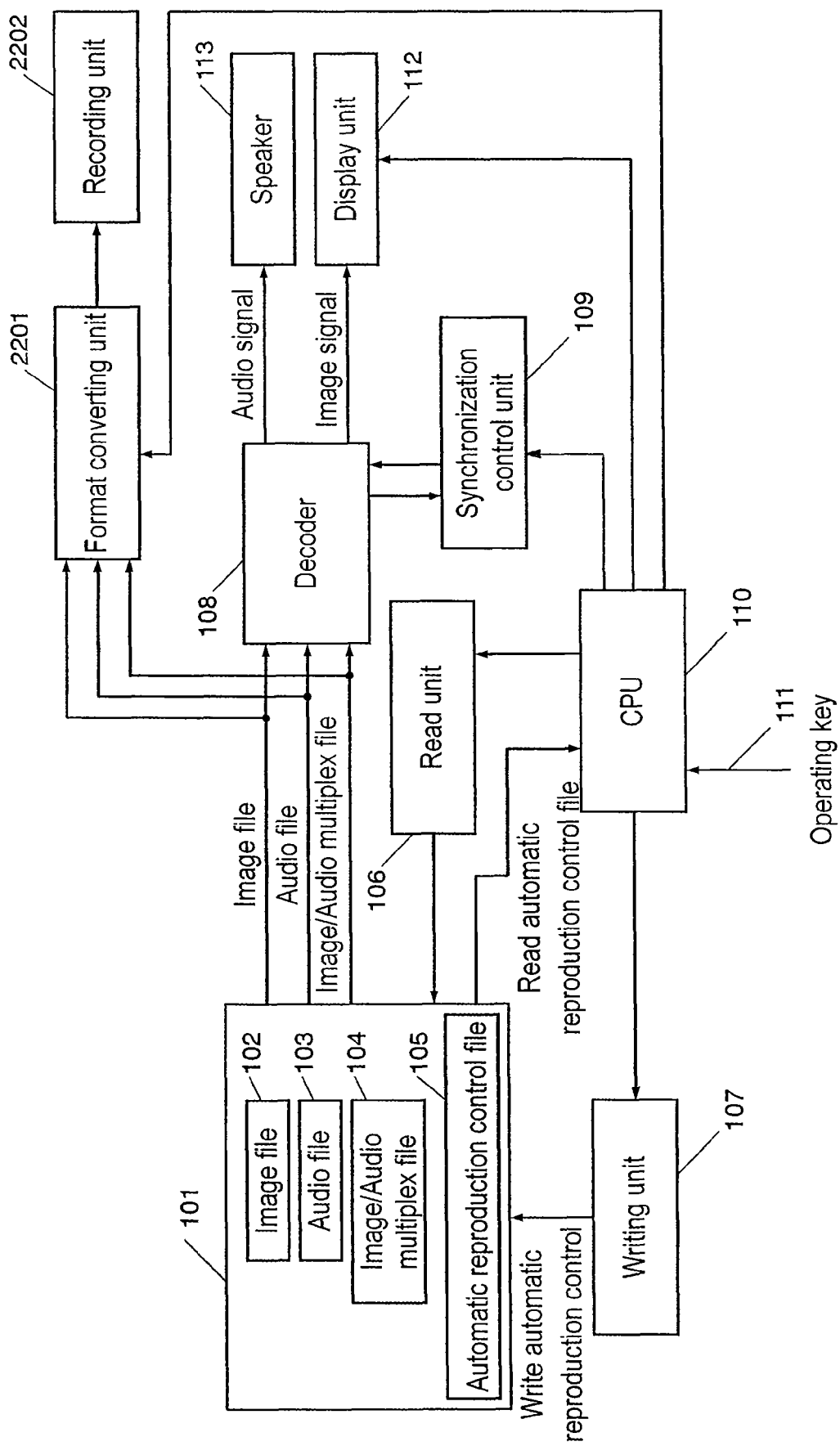
FIG. 22 is a block diagram of an image and audio reproducing apparatus in embodiment 6.

FIG. 22 is a block diagram of an image and audio reproducing apparatus in embodiment 6 of the invention. In the diagram, reference numerals 101 to 113 are the same as in embodiment 1 shown in FIG. 1, and the same explanation is omitted, only the portions different from FIG. 1 are described below.

In FIG. 22, format converting unit 2201 is means for converting the format of image file 102, audio file 103, and image/audio multiplex file 104 being read out from the storage unit 101. A recording unit 2202 is means for recording the file converted in format by the format converting unit 2201, which may be either fixed means such as a hard disk device, or detachable means such as flash memory card.

In embodiment 6 of the invention having such configuration, the operation is explained.

For example, the file shown in FIG. 3, and automatic reproduction control file "AUTOPLY4" having the content as shown in FIG. 12 explained in embodiment 4 of the invention are stored in the storage unit 101. Supposing to convert the image and audio to be reproduced according to the description of automatic reproduction control file "AUTOPLY4" into other format and store, the CPU 110 reads out the necessary image file, audio file, and image/audio multiplex file from the storage unit 101, and controls the format converting unit 2201 to convert these files into data of a different format composed of image and audio so as to maintain synchronized relation of image and audio as described in the automatic reproduction control file. As the format after conversion, for example, since the image and audio are the object of automatic reproduction, various files being readout from the storage unit 101 may be combined into one format of image/audio multiplex file. As a result, the image/audio multiplex file created by the format converting unit 2201 can be reproduced in any apparatus capable of reproducing an image/audio multiplex file.

Thus, according to embodiment 6 of the invention, the picture and sound reproduced by the image and audio reproducing apparatus explained in embodiments 1 to 5 of the invention can be similarly reproduced in other apparatus not having the function of automatic reproduction according to the automatic reproduction control file.

Figure 23:
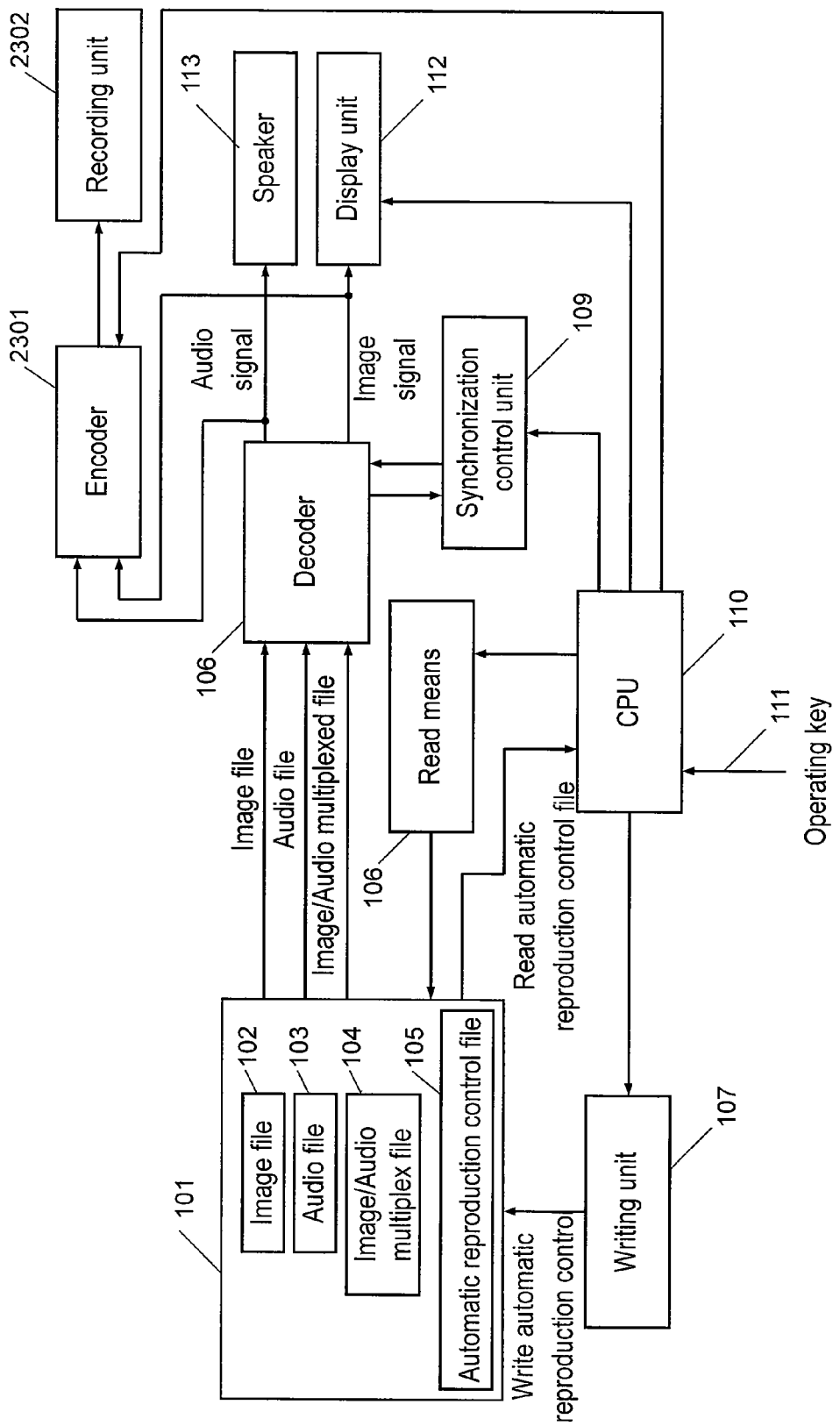
FIG. 23 is a block diagram showing other example of the image and audio reproducing apparatus in embodiment 6.

In the configuration shown in FIG. 22, various files being read out from the storage unit 101 are converted in format by the format converting unit 2201, but as shown in FIG. 23, alternatively, the image signal and audio signal decoded by the decoder 108 may be coded again by an encoder 2301, and recorded by recording unit 2302. In this case, too, the picture and sound reproduced by the image and audio reproducing apparatus explained in embodiments 1 to 5 of the invention can be similarly reproduced in other apparatus not having the function of automatic reproduction according to the automatic reproduction control file.

In embodiment 6 of the invention, the file format after being converted by the format converting unit 2201 is not particularly specified, and evidently the invention is effective and realized by any format. The file format after conversion described herein is a image/audio multiplex file having image and audio multiplexed and stored in one file format, but it is not limited. For example, depending on the image and audio reproducing apparatus, independent image file and audio file may be regarded as a pair, and picture and sound are reproduced simultaneously, and considering reproduction in such apparatus, the format converting unit 2201 may be designed to compile image in one file of image data only, compile audio in one file of audio data only, and create a pair of image file and audio file compiling audio and image respectively. Both files relating to image and audio may not be always created in the format converting unit 2201, and a file recording either picture or sound only may be created as required.

Similarly, the invention is effective regardless of the coding method of the encoder 2301. Further, the signal to be coded by the encoder 2301 may be either image signal or audio signal.

In embodiment 6 of the invention, the information recorded in the recording unit 2202 and 2302 may be either digitized information or analog signal. The recording unit 2202 and 2302 may be disk device such as a hard disk, or semiconductor memory or magnetic tape.

Also in embodiment 6 of the invention, the information converted in format or coded by the format converting unit 2201 or encoder 2301 may be stored in the storage unit 101. In this case, two recording unit are not needed in one apparatus, and the apparatus size is reduced and the power consumption is saved.

(Embodiment 7)

In embodiments 1 to 4 of the invention, by describing the group consisting of plural files in the automatic reproduction control file 105, picture and sound are reproduced synchronously by combining three types of files, that is, image file, audio file, and image/audio multiplex file. Herein, when reproducing image and audio according to the description of automatic reproduction control file 105, a case of reproducing by adding different information is explained.

Figure 24:
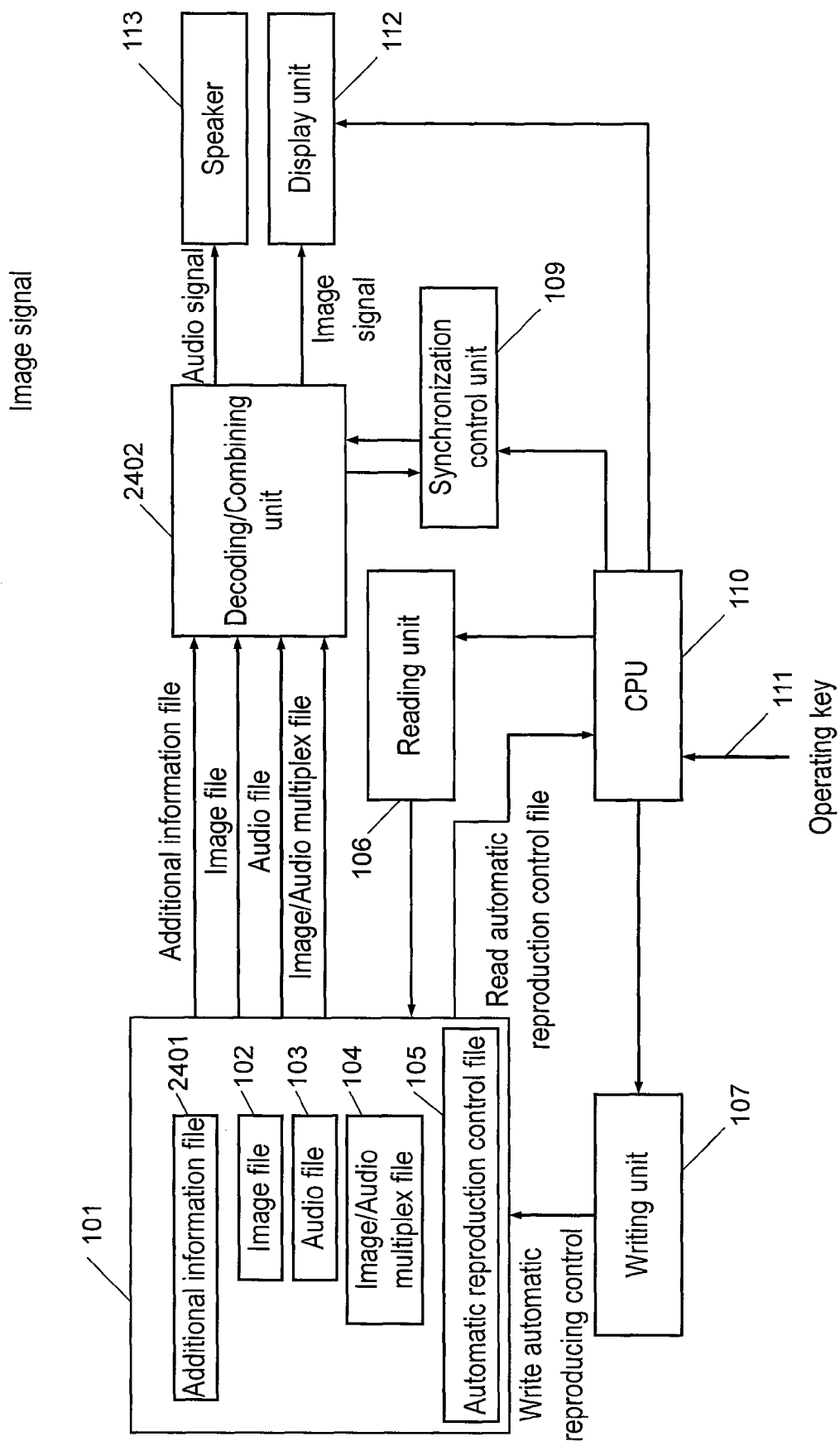
FIG. 24 is a block diagram of an image and audio reproducing apparatus in embodiment 7.

FIG. 24 is a block diagram of an image and audio reproducing apparatus in embodiment 7 of the invention. The difference of the block diagram in FIG. 24 from the block diagram in FIG. 1 relating to embodiments 1 to 4 of the invention is that an additional information file 2401 is stored in the storage unit 101 and that a decoding/combining unit 2402 is newly provided, in FIG. 24.

In FIG. 24, reference numerals 101 to 113 are the same as in the image and audio reproducing apparatus shown in FIG. 1, and the same explanation is omitted, only the portions different from FIG. 1 are described below.

The additional information file 2401 is a file storing combined information added to image file 102, audio file 103, and image/audio multiplex file 104, and includes, for example, frame image and title image displayed and overlaid on the image, date of taking image, place of taking, file name, camera operator's name, address and telephone number, comments on image and other text indicated by character codes, numerical data and symbols showing the conditions of taking, and special sound effects reproduced together with the sound. The decoding/combining unit 2402 is means for obtaining a signal combining image file 102, audio file 103, image/audio multiplex file 104, and additional information file 2401. In FIG. 24, for the sake of simplicity, only one additional information file 2401 is shown, but plural files may be present.

Figure 25:
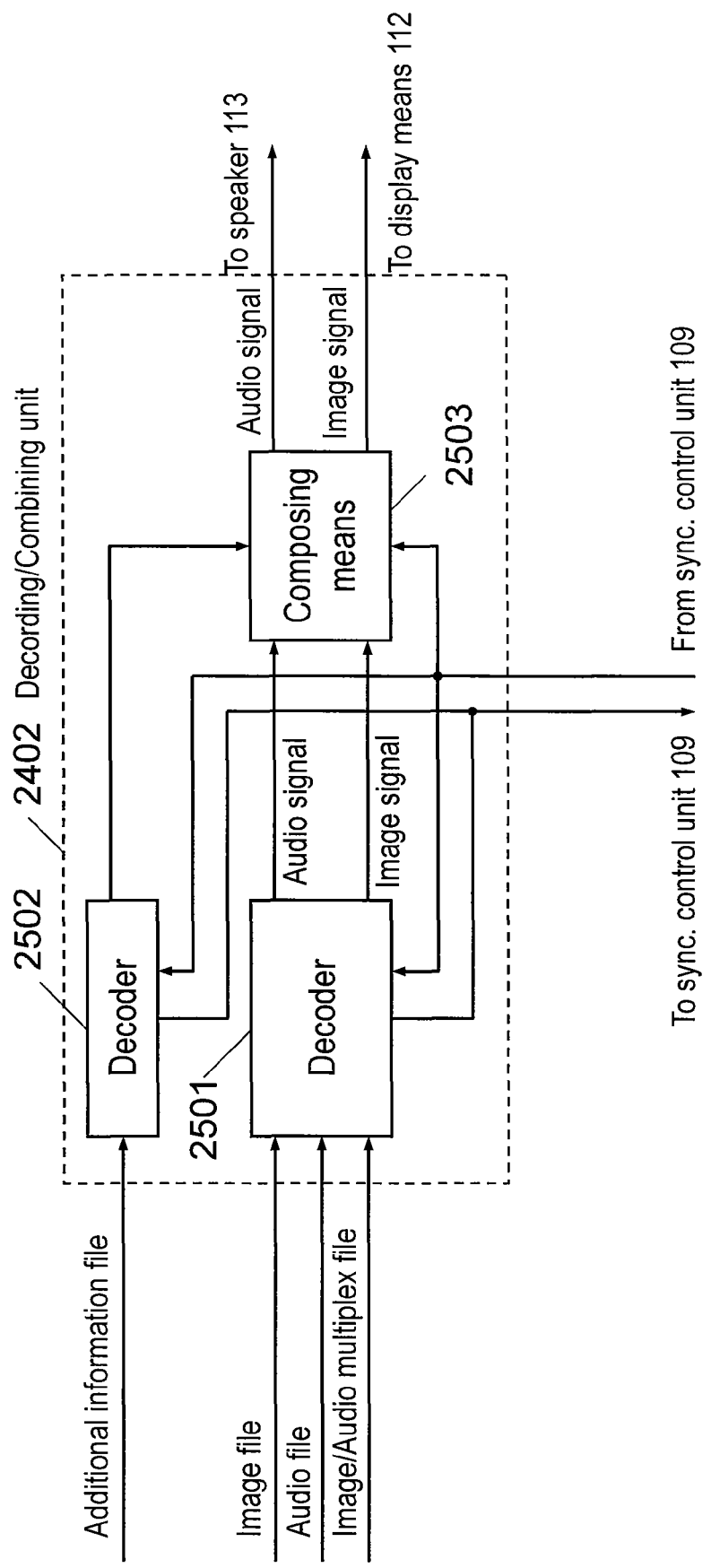
FIG. 25 is a block diagram of decoding/combining unit in embodiment 7.

FIG. 25 is a block diagram showing the configuration of the decoding/combining unit 2402. In FIG. 25, a decoder 2501 is means for decoding the image file, audio file, and image/audio multiplex file, in the same manner as the decoder 108 shown in FIG. 1. A decoder 2502 is similar means, and it is provided for decoding the additional information file 2401. A combining unit 2503 is means for overlaying or combining the signals decoded by the decoders 2501 and 2502, and issuing a combined output.

Figure 26:
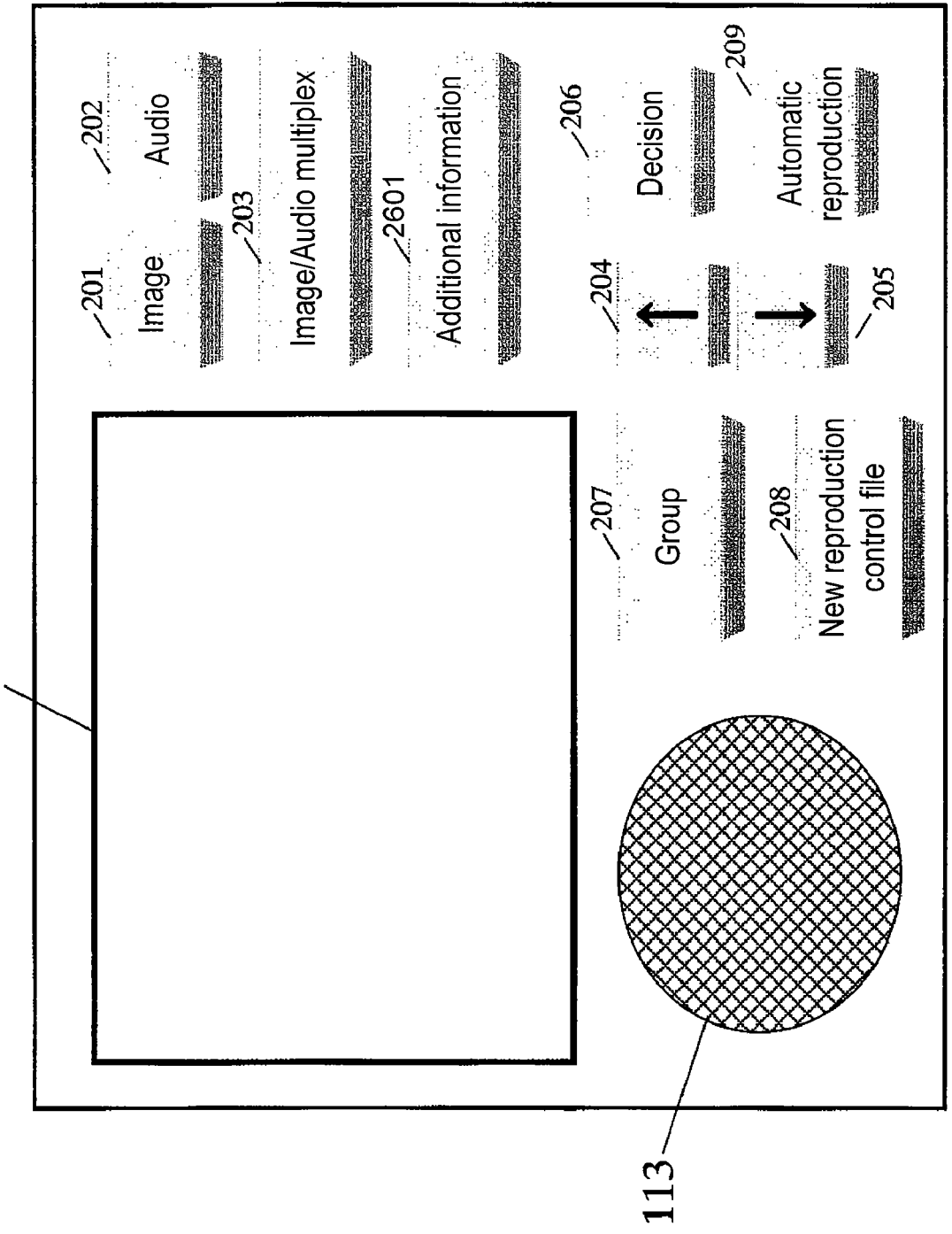
FIG. 26 is a layout diagram of operation panel of the image and audio reproducing apparatus in embodiment 7.

FIG. 26 is a layout diagram of operation panel of the image and audio reproducing apparatus in embodiment 7 of the invention. The difference from the layout shown in FIG. 2 is that an additional information reproduction mode select key 2601 is newly provided in FIG. 26.

The keys 201 to 209 are the same as the keys of the image and audio reproducing apparatus shown in FIG. 2, and are not explained here. The principal function of the additional information reproduction mode select key 2601 is as follows. In FIG. 26, the display unit 112 and speaker 113 are the same as in FIG. 2.

When the additional information reproduction mode select key 2601 is pressed, the CPU 110 controls the reading unit 106, and reads out one of the additional information files 2401 recorded in the storage unit 101, and it is decoded by the decoder 2402, and the content of the additional information file is reproduced in the display unit 112 or speaker 113. At this time, the signal decoded by the decoder 2502 is issued through the combining unit 2503, but nothing is processed in the combining unit 2503, and the output of the decoder 2502 is directly issued.

Figure 27:
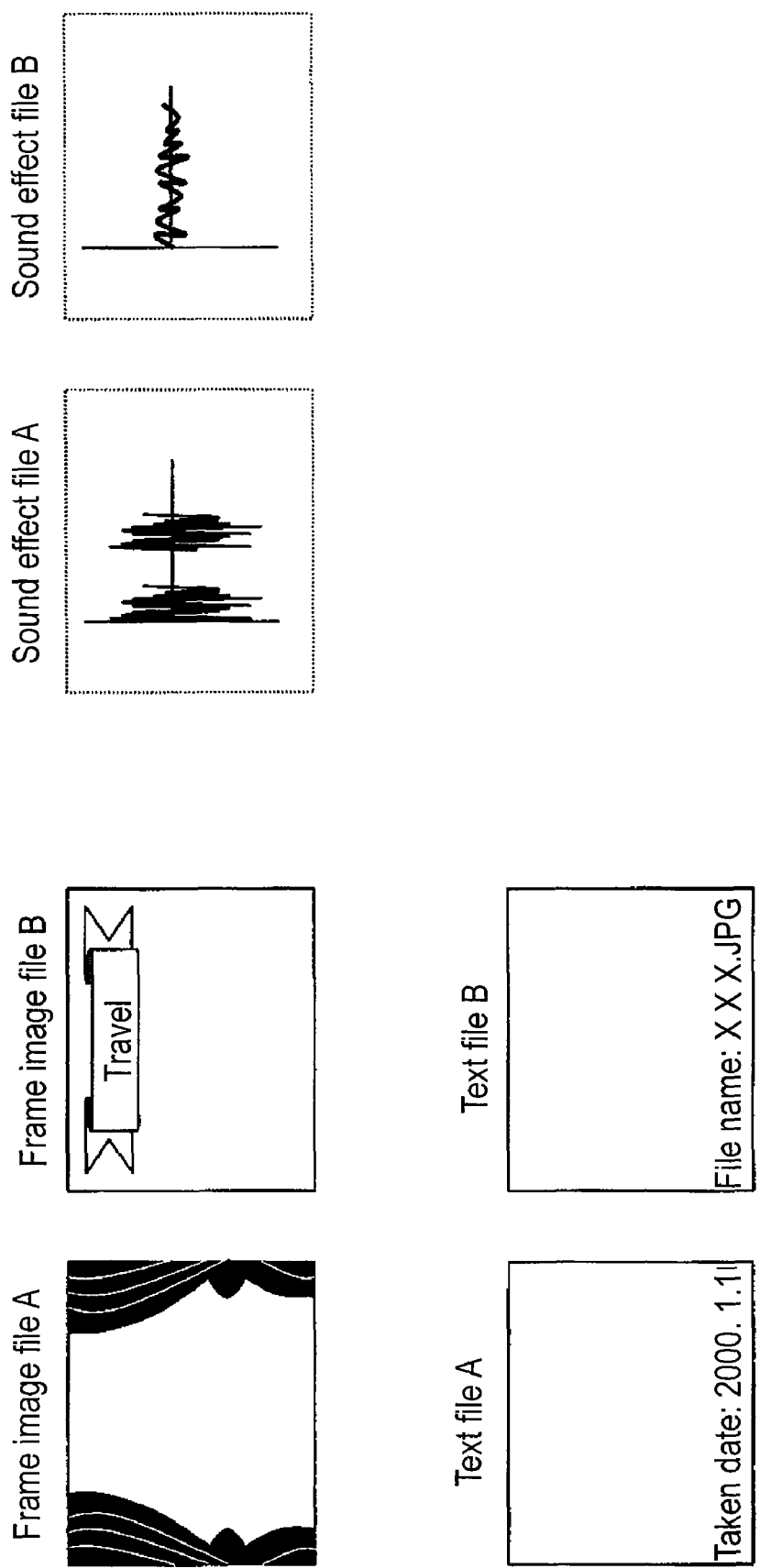
FIG. 27 is a schematic diagram showing an additional information file stored on the storage unit in embodiment 7.

FIG. 27 is a schematic diagram of additional information file stored in the storage unit 101. In FIG. 27, frame image files A, B, and text files A, B are additional information files for modifying the image files or adding information by characters by combining with image files. Sound effect files A, B are additional information files which are combined with audio files to superimpose special sound effects on the reproduced sound. In the following explanation, it is supposed that the six additional information files shown in FIG. 27 are recorded on the storage unit 101 together with eight files consisting of image files, audio files, and image/audio multiplex files shown in FIG. 3.

In embodiment 7 of the invention having such configuration, the operation is explained below by referring mainly to the difference from embodiment 1 of the invention.

When the additional information file 2401 recorded on the storage unit 101 is added to the image file 102, audio file 103, and image/audio multiplex file 104, and reproduced, an automatic reproduction control file as shown in FIG. 28 is created in the following procedure.

Using eight files shown in FIG. 3, suppose the user wishes to reproduce the picture and sound in the same combination as shown in embodiment 1 of the invention, and further reproduce by combining the image file B with the frame image file B, the image portion of image/audio multiplex file A with text file A, and audio file A with sound effect file B.

To begin with, the user presses the new reproduction control file create key 208. By this key input, editing of automatic reproduction control file is newly started, and the CPU 110 controls the writing unit 107, and creates a file in a file name of, for example, "AUTOPLY6" on the storage unit 101.

Next, the user presses, in the same way as in embodiment 1 of the invention, the image file reproduction mode select key 201 for selecting the image to be reproduced automatically, and the image file on the storage unit 101 is reproduced and displayed in the display unit 112, and by using the send key 204 or return key 205, the image file B to be reproduced first is displayed in the display unit 112. Then the decision key 206 is pressed. By pressing of the decision key 206, the CPU 110 records the file name of the image file B in its internal temporary memory in succession to the character string "IMG_SRC=". To select the additional information file to be combined with the image file B, the additional information reproduction mode select key 2601 is pressed, and the additional information file 2401 on the storage unit 101 is reproduced. At this time, if the additional information file to be reproduced is a frame image file, this image is displayed on the display unit 112, and in the case of a text file, the text included in the file is displayed on the display unit 112, or in the case of a sound effect file, the sound effect is reproduced from the speaker 113. In the same procedure as when the image file is selected, the additional information file to be superimposed is reproduced, and the decision key 206 is pressed, so that the additional information file name is stored in the temporary memory of the CPU 110. At this time, the file name of the frame image file B is stored, in succession to the character string "ADD_SRC" to show it is an additional information file.

In the similar procedure, after selection of image portion of the image/audio multiplex file A, text file A is selected as additional information file, and after selection of audio file A, sound effect file B is selected as additional information file, and then the file name of image/audio multiplex file B is selected as the audio information, and in this way the file names of the image file, audio file, and image/audio multiplex file desired to be reproduced, and the file names of the additional information files are stored in the temporary memory of the CPU 110 together with the character string explained above.

When the group key 207 is pressed in this state, the CPU 110 recognizes these selected files, that is, image file B and image portion of image/audio multiplex file A, audio file A and audio portion of image/audio multiplex file B, and the corresponding additional information files, that is, frame image file B, text file A, and sound effect file B, as one group, and provides the group with an original ID number (for example, 001), and controls the writing unit 107, and writes the group original ID number and the content stored in the temporary memory of the CPU 110, sequentially in the order of storage, in the automatic reproduction control file "AUTOPLY6" on the storage unit 101. FIG. 28 shows the content of the written automatic reproduction control file "AUTOPLY6".

Of the files indicated by "IMG_SRC", "SND_SRC", the file having the smaller number of lines is the file to be reproduced first, and the file designated by "ADD_SRC" is the additional information file to be combined with the file described in the immediately preceding line as counted from the earlier number line.

This is the procedure of creating the automatic reproduction control file 105. Reproduction of file according to the automatic reproduction control file 105 shown in FIG. 28 is explained.

When the user presses the automatic reproduction key 209, the CPU 110 controls the reading unit 106, reads out the automatic reproduction control file 105, and acquires its content. The CPU 110 searches for the GID from the first line of the automatic reproduction control file, and recognizes from the first GID to just before next GID as one group. The final group in the automatic reproduction control file 105 is from the final GID to the final line of the file.

The automatic reproduction control file includes file names in the sequence of reproduction. Since the file designated by "ADD_SRC" is an additional information file, this additional information file is combined and reproduced when reproducing the file described in the line immediately preceding the description of "ADD_SRC". Specifically, the CPU 110 sends the information showing the file to be combined to the combining unit 2503 by way of the synchronization control unit 109. The combining unit 2503 receives signals sent from the decoders 2501 and 2502, and judges the one to be combined out of them according to the instruction of the CPU 110 through the synchronization control unit 109, and executes the combining process.

As a result, when reproducing the image file B, the frame image file B is combined, and when reproducing the image portion of image/audio multiplex file A, text file A is combined, and as for the sound, when reproducing the audio file A, sound effect file B is combined. In the audio portion of the image/audio multiplex file B, since combination of additional information file is not instructed, the audio portion of the image/audio multiplex file B is directly reproduced.

Figure 29:
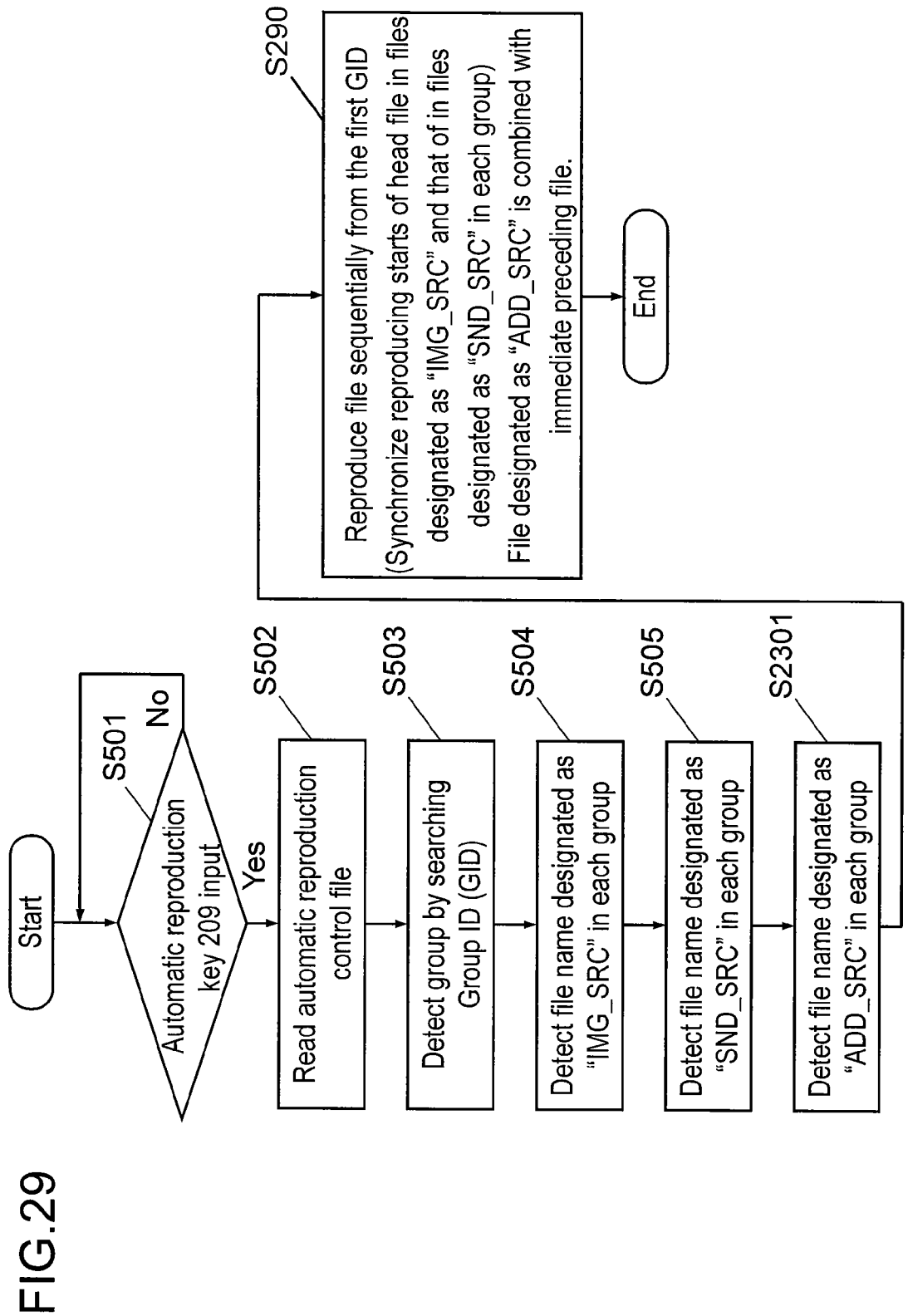
FIG. 29 is a flowchart of automatic reproduction operation in embodiment 7.

This series of flow of reproduction of files is shown in a flowchart in FIG. 29. In FIG. 29, steps 501 to 505 are the same as in FIG. 5, and the explanation is omitted. Step 2901 is a step for detecting the file name designated by character string "ADD_SRC" showing the additional information file in every detected group. At step 2902, the CPU 110 reads out the designated files and additional information files from the storage unit 101, and controls decoding by the decoders 2501, 2502, and combination of picture or sound and additional information file by the combining unit 2503.

Figure 30:
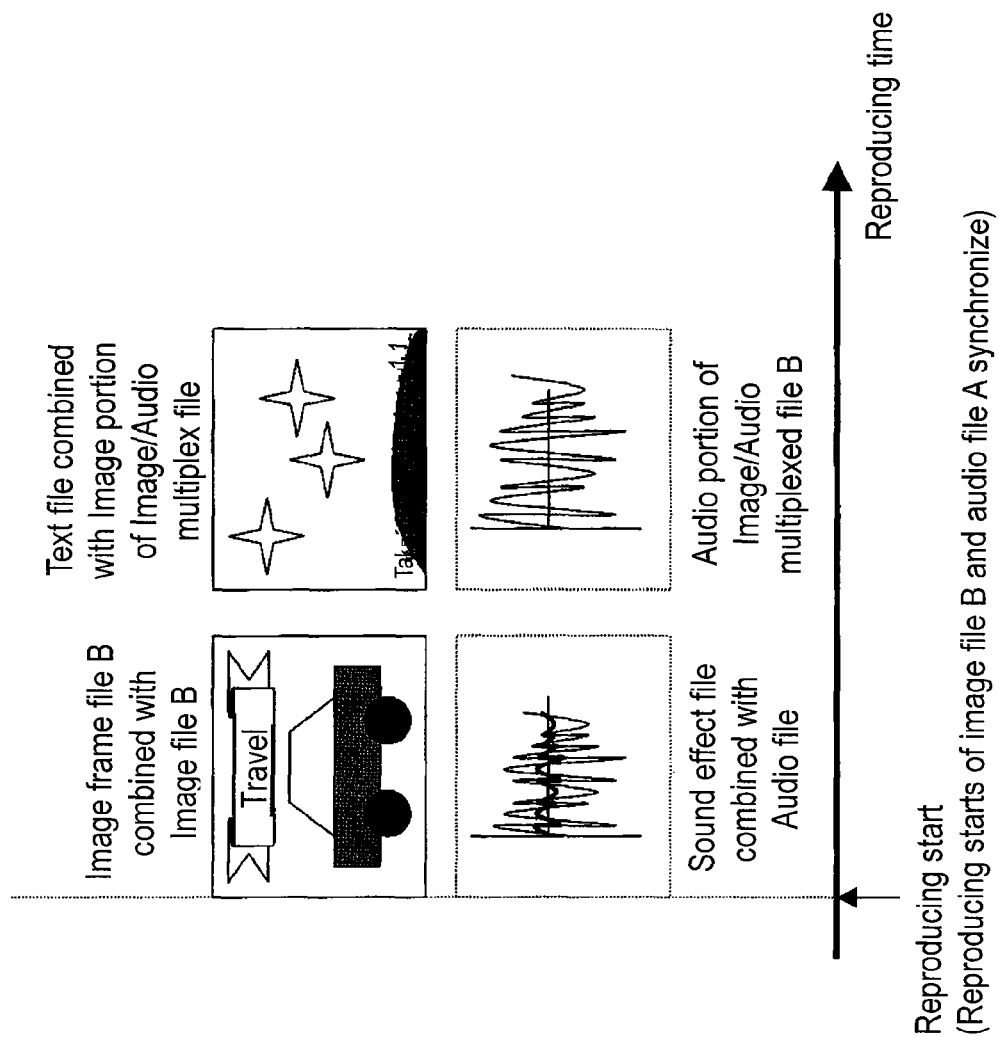
FIG. 30 is an explanatory diagram of combination of image file, audio file, and additional information file reproduced automatically in embodiment 7.

Such mode of reproduction of picture and sound is schematically shown in FIG. 30. That is, the image is reproduced in the sequence of the image file B combined with frame image B, and image portion of image/audio multiplex file A combined with text file A, and in synchronism with the start of reproduction of image file B, the audio file A combined with sound effect file is reproduced, and in synchronism with the image portion of the image/audio multiplex file A, the audio portion of the image/audio multiplex file B is reproduced in this order. Thus, the user can reproduce the picture and sound in a format combined with additional information file, exactly as designated by own.

Thus, according to embodiment 7, according to the description of the automatic reproduction control file 105, when reproducing picture and sound in synchronism by combining three types of files of image file, audio file, and image/audio multiplex file, combination of additional information file can be instructed, and the picture and sound can be freely reproduced in a format combined with the additional information file.

In embodiment 7 of the invention, two decoders 2501 and 2502 shown in FIG. 25 may not be always needed, and one decoder may be used commonly.

As examples of additional information file in embodiment 7 of the invention, frame image file, text file, and sound effect file are shown, but the information to be added to the picture and sound to be reproduced is not limited to these files alone.

Also in embodiment 7 of the invention, "ADD_SRC" is used as character string for designating the additional information file, but this is only an example and is not limited.

(Embodiment 8)

In embodiments 1 to 4 of the invention, by describing a group consisting of plural files in the automatic reproduction control file 105, three types of files of image file, audio file, and image/audio multiplex file are combined, and picture and sound are reproduced synchronously. In these examples, the reproduction time of picture and sound is not particularly mentioned, and this is to explain an example of reproducing by designating the reproduction time of picture and sound when reproducing the picture and sound according to the description of automatic reproduction control file 105.

Figure 31:
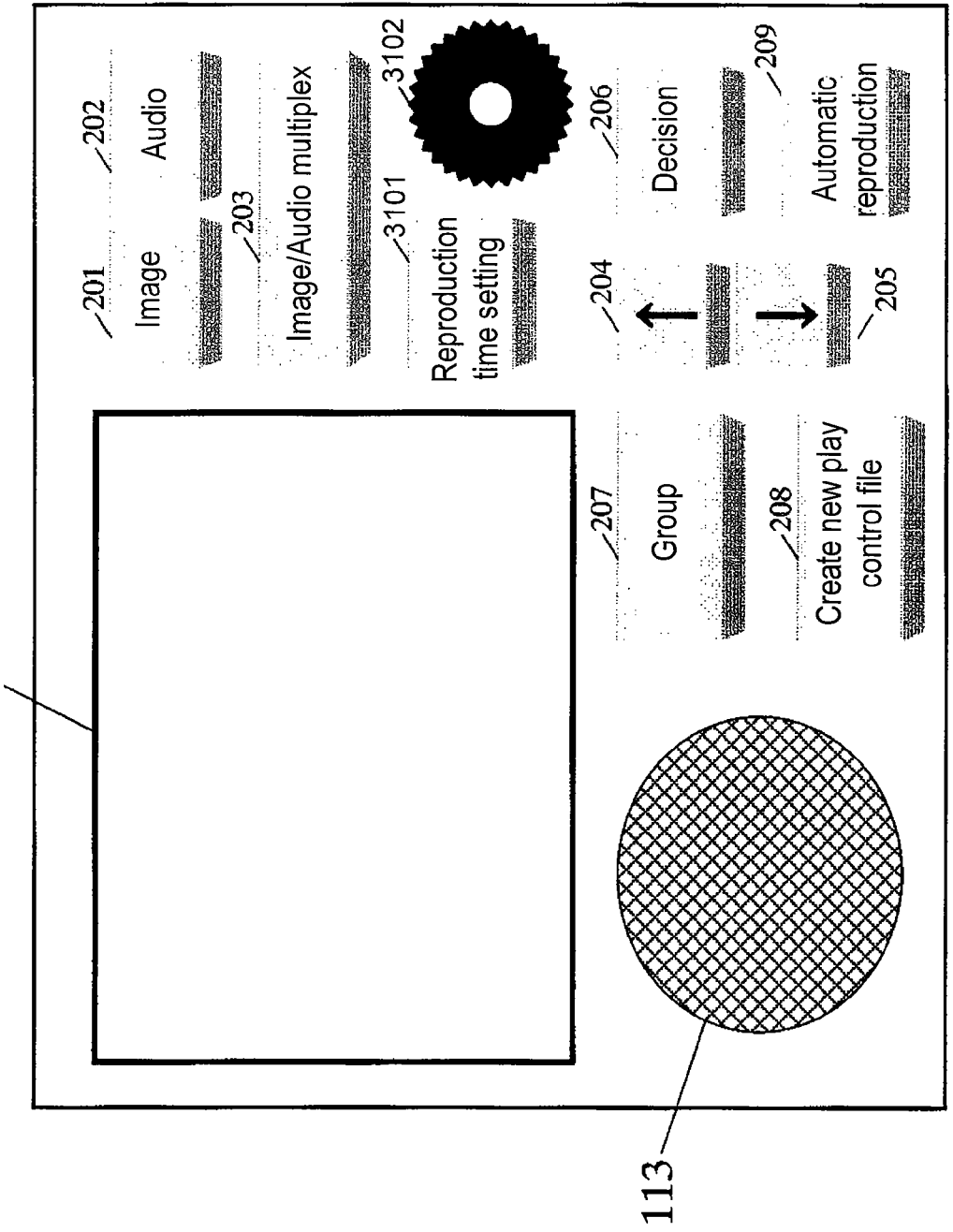
FIG. 31 is a layout diagram of operation panel of a image and audio reproducing apparatus in embodiment 8.

FIG. 31 is a layout diagram of operation panel of an image and audio reproducing apparatus in embodiment 8 of the invention. As compared with the layout in FIG. 2, a reproduction time setting key 3101 and a numerical input dial 3102 are newly provided in FIG. 31.

Keys 201 to 209 are the same as the keys of the image and audio reproducing apparatus shown in FIG. 2, and the explanation is omitted. Principal functions of the reproduction time setting key 3101 and numerical input dial 3102 are as follows.

When the reproduction time setting key 3101 is pressed, it results in the mode for setting the reproduction time of the selected file. An arbitrary numerical value is entered by rotating the numerical input dial 3102.

The configuration of the image and audio reproducing apparatus in embodiment 8 of the invention is the same as the block diagram in FIG. 1, and its explanation is omitted.

Concerning embodiment 8 of the invention having such configuration, the operation is explained below mainly referring to the points different from embodiment 1 of the invention.

When reproducing the image file 102, audio file 103, and image/audio multiplex file 104 recorded on the storage unit 101 by designating the reproduction time, the automatic reproduction control file is created in the following procedure.

Among the eight files shown in FIG. 3, suppose the user desires to reproduce the picture and sound in the same combination as in embodiment 1 of the invention, and to specify each reproduction time.

First, the user presses the new reproduction control file create key 208. By this key input, editing of automatic reproduction control file shown in FIG. 32 is newly started, and the CPU 110 controls the writing unit 107, and creates a file in a file name of, for example, "AUTOPLY7" on the storage unit 101.

Next, the user presses the image file reproduction mode select key 201 for selecting the picture to be reproduced automatically in the same way as in embodiment 1, and reproduces and displays the image file on the storage unit 101 in the display unit 112, and by using the send key 204 or return key 205, the image file B to be reproduced first is displayed in the display unit 112. Then the decision key 206 is pressed. By pressing of the decision key 206, the CPU 110 records the file name of image file B in succession to the character string "IMG_SRC=" in its internal temporary memory. Then, to designate the reproduction time, when the reproduction time setting key 3101 is pressed, a candidate value of reproduction time is displayed in the display unit 112, for example, in the unit of seconds. The candidate value may be an initial value preset in the apparatus. When the user turns the numerical input dial 3102, the candidate value of reproduction time changes according to the rotation, and when a desired reproduction time appears, the numerical input dial is stopped. For example, to reproduce the image file B for 10 seconds, the numerical input dial 3102 is turned until the reproduction time displayed in the display unit 112 is 10 seconds. Then the decision key 206 is pressed. The reproduction time displayed in the display unit 112 is stored in the temporary memory of the CPU 110. At this time, the reproduction time is stored in the unit of seconds in succession to the character string "PLY_DUR" showing this reproduction time.

In the similar procedure, after selecting the image portion of image/audio multiplex file A, reproduction time of 15 seconds is set, and also after selection of audio file A, reproduction time of 20 seconds is set, and finally reproduction time of 5 seconds is set for the audio portion of image/audio multiplex file B.

After completion of selection of the file to be reproduced and setting of reproduction time, when the group key 207 is pressed, the CPU 110 recognizes the two selected image file B and image/audio multiplex file A, and audio file A and audio portion of image/audio multiplex file B as one group, and provides with an original group ID number (for example, 001), and controls the writing unit 107, and writes the group original ID number and the content stored in the temporary memory of the CPU 110 in the automatic reproduction control file "AUTOPLY7" on the storage unit 101 in the sequence of storage. FIG. 32 shows the content of the written automatic reproduction control file "AUTOPLY7".

Of the files indicated by "IMG_SRC" and "SND_SRC", the file of the smaller number of lines is the file to be reproduced first in time, and the numerical value designated by "PLY_DUR" is the reproduction time shown in the unit of seconds. In the example of automatic reproduction control file "AUTOPLY7" in FIG. 32, the reproduction time of image file B is 10 seconds, the reproduction time of image portion of image/audio multiplex file A is 15 seconds, the reproduction time of audio file A is 20 seconds, and the reproduction time of audio portion of image/audio multiplex file B is 5 seconds. The reproduction time designated by "PLY_DUR" is the duration of reproduction of the file described in the line immediately before as counted from the line of the earlier number.

This is the procedure of creating the automatic reproduction control file 105. Reproduction of files according to the automatic reproduction control file 105 shown in FIG. 32 is explained below.

When the user presses the automatic reproduction key 209, the CPU 110 controls the reading unit 106, reads out the automatic reproduction control file 105, and acquires its content. The CPU 110 searches for the GID from the first line of the automatic reproduction control file, and recognizes from the first GID to just before next GID as one group. The final group in the automatic reproduction control file 105 is from the final GID to the final line of the file.

The automatic reproduction control file includes file names in the sequence of reproduction. Since the numerical value designated by "PLY_DUR" is the reproduction time in the unit of seconds, when reproducing the file described in the line immediately before description of "PLY_DUR", it is reproduced only for this duration. Specifically, the CPU 110 sends the information showing the files to be reproduced synchronously and the information about the reproduction time to the synchronization control unit 109. The synchronization control unit 109 monitors the progress of decoding of the picture and sound to be reproduced, and upon completion of decoding of the data corresponding to the designated reproduction time of picture and sound, decoding by the decoder 108 is stopped, and decoding of image and audio to be decoded next is started. Thus, the reproduction time of picture and sound is controlled.

As a result, the image file B is reproduced for 10 seconds, and the image portion of the succeeding image/audio multiplex file A is reproduced for 15 seconds. Synchronously with reproduction of image file B, reproduction of audio file A is started, and after reproduction for 20 seconds, the audio portion of the succeeding image/audio multiplex file B is reproduced for 5 seconds, and the series of reproduction of picture and sound is terminated.

Figure 33:
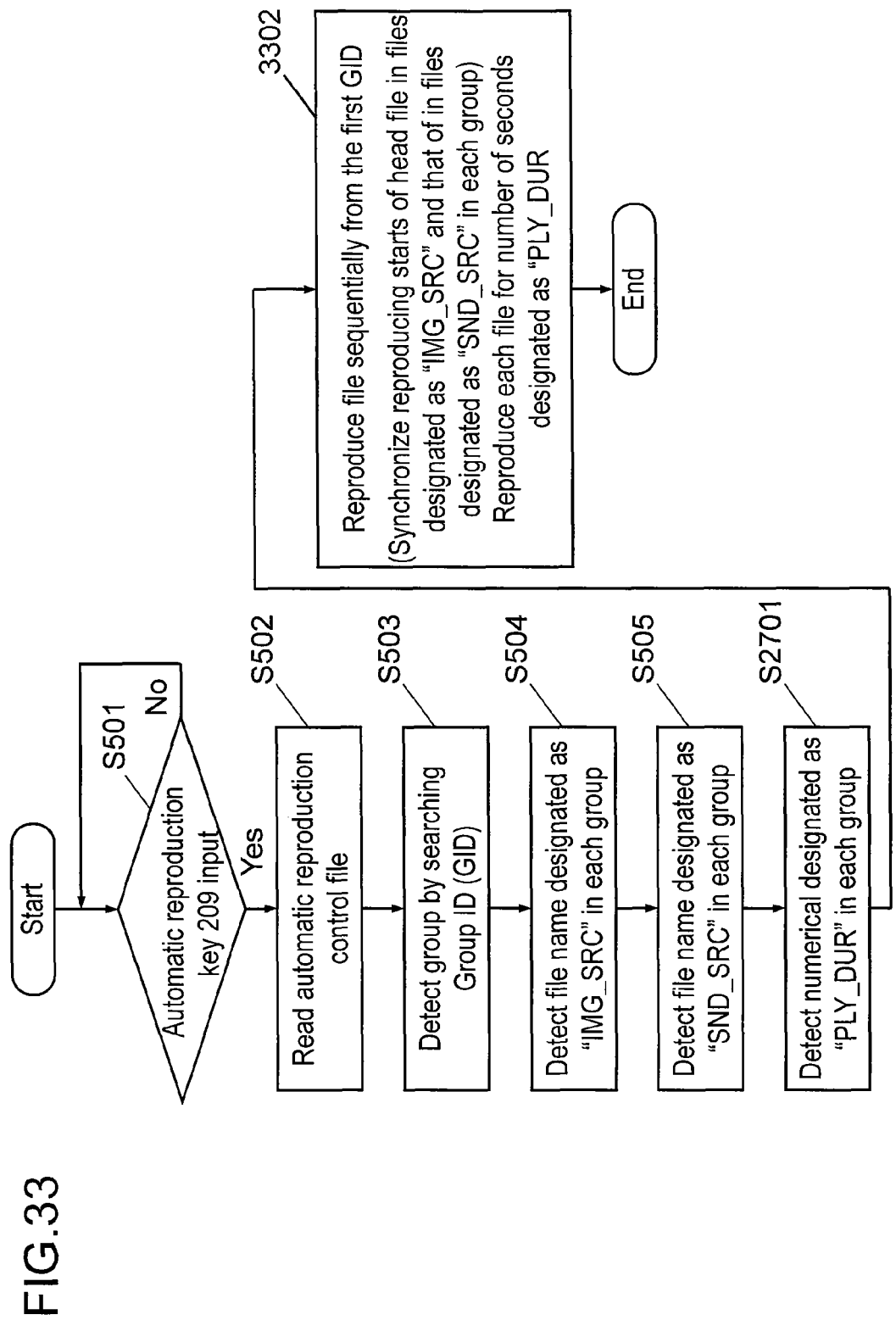
FIG. 33 is a flowchart of automatic reproduction operation in embodiment 8.

This series of flow of reproduction of files is shown in a flowchart in FIG. 33. In FIG. 33, steps 501 to 505 are the same as in FIG. 5, and the explanation is omitted. Step 3301 is a step for detecting the numerical value designated by the character string "PLY_DUR" showing the reproduction time of each file in each detected group. At step 3302, the CPU 110 reads out each designated file from the storage unit 101, and instructs the files to be reproduced synchronously and the reproduction time to the synchronization control unit 109. The synchronization control unit 109 controls decoding in the decoder 108, and also controls synchronized reproduction of picture and sound and the reproduction time.

Figure 34:
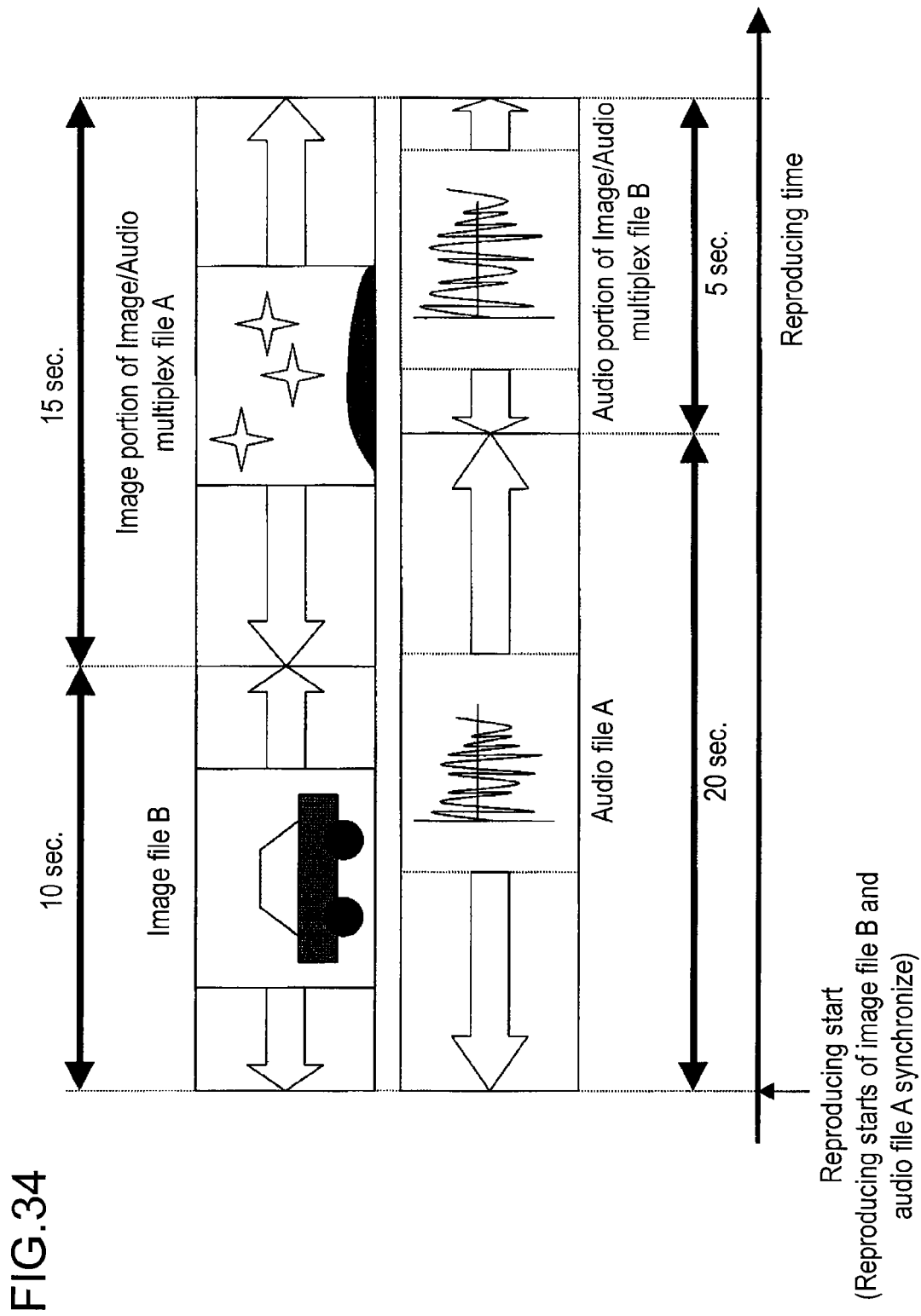
FIG. 34 is an explanatory diagram of reproduction duration of image and audio reproduced automatically in embodiment 8.
Figure 37:
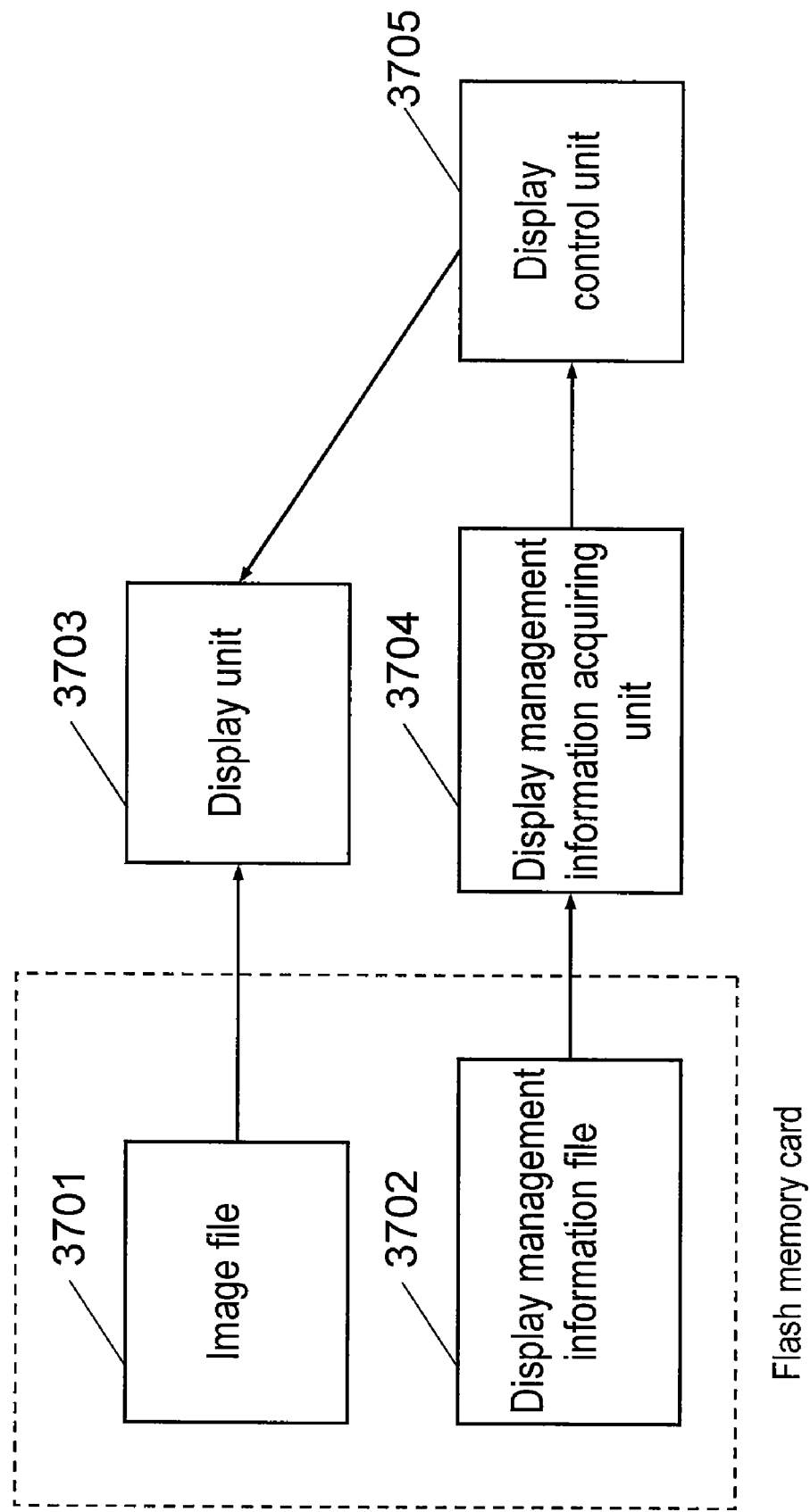
FIG. 37 is a block diagram of an automatic reproducing apparatus in a prior art.

Such mode of reproduction of image and audio is schematically shown in FIG. 34, in which the user can reproduce the image and audio exactly for the duration designated by own.

Thus, according to embodiment 8 of the invention, when reproducing the image and audio synchronously by combining three types of files of image file, audio file, and image/audio multiplex file, according to the description of the automatic reproduction control file 105, the reproduction time of each file can be designated. Therefore, the image and audio can be freely reproduced for the designated duration.

In embodiment 8 of the invention, the reproduction time is designated as the reproduction time of each file, but not limited to this, for example, supposing the reproduction start time of the first file to be reproduced to be 0, the reproduction time of each file can be set by the absolute time from this reproduction start time. As shown in FIG. 35, for example, the total of reproduction time of all files reproduced automatically is designated by "PLY_TTL", and the reproduction start time of each file is designated by "PLY_TIM", and therefore, similarly, the reproduction time of each file to be reproduced can be set. In the example in FIG. 35, the total time of automatic reproduction is 25 seconds, the reproduction start time of the image file B to be reproduced in the first place is designated at 0 second by the character string "PLY_TIM", and the reproduction start time of the image portion of the image/audio multiplex file A to be reproduced next is designated at 10 seconds by the character string "PLY_TIM", so that the files are reproduced in same manner as explained in FIG. 32 and FIG. 34.

Also in embodiment 8 of the invention, the candidate value of reproduction time displayed in the display unit 112 when the reproduction time setting key 3101 is pressed is the initial value preset in the apparatus, but not limited to this, for example, the time necessary for reproducing all data stored in the files of image file, audio file, and image/audio multiplex file (for example, 5 seconds in the case of image file storing a moving image for 5 seconds, and 10 seconds in the case of audio file storing audio data for 10 seconds) is judged from the data in each file, and this value may be first shown in the display unit 112.

Also in embodiment 8 of the invention, the reproduction time is set in the unit of seconds, but not limited to this, any time unit including fractions is effective in the invention.

Also in embodiment 8 of the invention, the image file and image portion of image/audio multiplex file may be either a moving image consisting of plural frames, or a still image consisting of one frame only, and if the image is a still image, the still image may be displayed for a designated duration.

Also in embodiment 8 of the invention, if the image file or image portion of image/audio multiplex file is a moving image, when reproducing the file for the designated time, both a method of starting reproduction from the beginning of the moving image and a method of setting the reproduction start point freely by the user may be considered. When the user designates the reproduction start point arbitrarily, for example, the reproduction start point of the moving image is indicated by the time from the beginning portion of the moving image, and it is expressed by character string "PLY_STR", and it may be described in succession to the character string "PLY_DUR" in the automatic reproduction control file. For example, referring to the automatic reproduction control file shown in FIG. 32, assuming the image file B to be a moving image of 30 seconds, when reproducing the image file B for 10 seconds from the point of 3 seconds after the beginning, the automatic reproduction control file is described as shown in FIG. 36. The character string "PLY_STR" shows the reproduction start point of the moving image, and by designating "3" herein, the reproduction start point of the image file B can be designated. In this character string "PLY_STR", not limited to the image file, the reproduction start point of the image portion of image/audio multiplex file or audio file may be designated. If the reproduction start point is not designated by the character string "PLY_STR", it may be designed to start reproduction of the moving image from the beginning unconditionally.

Also in embodiment 8 of the invention, in the case the reproduction object file is a moving image, if the designated reproduction time is longer than the time necessary for reproducing all image data stored in the files of image file and image/audio multiplex file, after completion of reproduction of the moving image within the designated time, blue background or other image prepared in the apparatus may be displayed. For example, if reproduction of 10 seconds is designated for a moving image of 3 seconds, the image is displayed for the first 3 seconds, and a blue background is displayed for the remaining 7 seconds. As for the audio, similarly, if the designated reproduction time is longer than the time necessary for reproducing all audio data stored in the files of audio file and image/audio multiplex file, after completion of reproduction of the audio within the designated time, other audio prepared in the apparatus or silence may be reproduced.

Also in embodiment 8 of the invention, in the case the reproduction object file is a moving image, if the designated reproduction time is longer than the time necessary for reproducing all image data stored in the files of image file and image/audio multiplex file, an error message may be displayed on the display unit 112, urging the user to set the time correctly for reproducing all image data.

Also in embodiment 8 of the invention, as character strings designating the reproduction time and others, "PLY_DUR", "PLY_TTL", "PLY_TIM", and "PLY_STR" are used, but these are only examples and are not limited.

In all embodiments of the invention, the coding method and file format of image file, audio file, and image/audio multiplex file are not particularly specified, but it is evident that the invention is effective regardless of coding method or format of the files. Likely, the invention is valid whether the image file, audio file, and image/audio multiplex file are compressed files or non-compressed files, or whether the files are provided with header or additional information or not.

Also in all embodiments of the invention, as character strings for designating files, "IMG_SRC", "SND_SRC", "CMP_SRC" are used, but these are only examples and are not limited.

Also in all embodiments of the invention, the decoder 108 includes a digital-to-analog converter for converting a digital signal into an analog signal.

Also in all embodiments of the invention, the key input of the operation key 111 is effected by pressing any one of the keys 201 to 208 shown in FIG. 2, but not limited to this, for example, necessary operation may be selected from a touch panel or menu display on a liquid crystal display device.

Also in all embodiments of the invention, only one automatic reproduction file used in reproduction is shown on the storage unit 101, but plural automatic reproduction control files may be present on the storage unit 101, and the user may freely select one automatic reproduction control file used in automatic reproduction. In this case, among other examples, all automatic reproduction control files on the storage unit 101 are displayed on the display unit 112, and the user selects a desired automatic reproduction control file by key input or the like.

Also in all embodiments of the invention, the automatic reproduction control file is recorded on the storage unit 101, but not limited to this, for example, it may be recorded on other storage unit than the storage unit 101.

Also in all embodiments of the invention, when creating the automatic reproduction control file, the picture or sound is reproduced, but not limited to this, for example, without reproducing the picture or sound, their file names may be displayed in the display unit 112, and a file for automatic reproduction may be selected from the file names.

Also in all embodiments of the invention, when creating an automatic reproduction control file, the picture or sound is reproduced, but as for the picture, a thumbnail image may be displayed. As for the audio, only a part, for example, the beginning portion may be reproduced.

Also in all embodiments of the invention, the number of frames in the image file and image portion of image/audio multiplex file is not particularly specified, and the image may be either a still picture of one frame or a moving picture consisting of plural frames.

Also in all embodiments of the invention, when creating an automatic reproduction control file, the picture or sound is reproduced, but in the case of a moving picture consisting of plural frames, only a part of the picture may be displayed.

Also in all embodiments of the invention, at least processing by the CPU 110 can be realized by the software, and the software may be preliminarily stored in the memory or provided from other recording medium.

Industrial Applicability

As described herein, according to the invention, files of different formats, such as a data file recording image signals, a data file recording audio signals, and a data file multiplexing and recording image signals and audio signals, can be freely and easily combined by the user, or various additional information may be given to the picture or sound, and the files may be reproduced continuously by changing the sequence of reproduction or making other modifications, and the apparatus can execute start of reproduction of specified picture and sound synchronously.

The invention claimed is:

1. An apparatus for generating an automatic reproduction control file, which is used when at least one of a first data file including an image signal, a second data file including an audio signal and a third data file including an image signal and an audio signal is automatically reproduced, said apparatus comprising:
   a controller for generating the automatic reproduction control file in which an information for automatically reproducing a part or all of the first data file, the second data file and the third data file is described,
   wherein in the automatic reproduction control file, file designating information, which indicates the data file to be automatically reproduced, is sequentially described in at least one group, and a group identifier designating each of the at least one group is described such that a plurality of groups having the same group identifier do not exist in the same automatic reproduction control file,
   wherein, in case that a plurality of groups exists, the automatic reproduction control file is generated such that the file designating information of an n-th group of the plurality of groups is automatically positioned between a group identifier of the n-th group and a group identifier of an (n+1)th group, and
   wherein the n-th group includes a time information related to a reproduction time when the data file included in the n-th group is automatically reproduced.

2. The apparatus for generating the automatic reproduction control file of claim 1,
   wherein the controller describes the file designating information in an order of reproducing the data file.

3. The apparatus for generating the automatic reproduction control file of claim 1,
   wherein the time information is relating to a reproduction time of a data file of the group to which the time information belongs.

4. The apparatus for generating the automatic reproduction control file of claim 3,
   wherein the time information is described by a second unit.

5. The apparatus for generating the automatic reproduction control file of claim 3,
   wherein the time information defines at least one of a start time of reproducing a data file corresponding to the time information and an end time of reproducing a data file corresponding to the time information.

6. The apparatus for generating the automatic reproduction control file of claim 3,
   wherein the time information includes an information which defines a total reproducing time of a group to which the time information belongs.

7. The apparatus for generating the automatic reproduction control file of claim 1,
   wherein the time information is written, in the automatic reproduction control file, adjacent to a data file corresponding to the time information.

8. A method for generating an automatic reproduction control file, in which is used when at least one of a first data file including an image signal, a second data file including an audio signal and a third data file including an image signal and an audio signal is automatically reproduced, said method comprising:
   controlling to generate the automatic reproduction control file in which an information for automatically reproducing a part or all of the first data file, the second data file and the third data file is described,
   wherein in the automatic reproduction control file, file designating information, which indicates the data file to be automatically reproduced, is sequentially described in at least one group, and a group identifier designating each of the at least one group is described such that a plurality of groups having the same group identifier do not exist in the same automatic reproduction control file,
   wherein, in case that a plurality of groups exists, the automatic reproduction control file is generated such that the file designating information of an n-th group of the plurality of groups is automatically positioned between a group identifier of the n-th group and a group identifier of an (n+1)th group, and
   wherein the n-th group includes a time information related to a reproduction time when the data file included in the n-th group is automatically reproduced.

9. The method for generating an automatic reproduction control file of claim 8,
   wherein the file designating information is described in a order of reproducing the data file.

10. The method for generating an automatic reproduction control file of claim 8,
    wherein the time information is relating to a reproduction time of a data file of the group to which the time information belongs.

11. The method for generating an automatic reproduction control file of claim 10,
    wherein the time information is described by a second unit.

12. The method for generating an automatic reproduction control file of claim 10,
    wherein the time information defines at least one of a start time of reproducing a data file corresponding to the time information and an end time of reproducing a data file corresponding to the time information.

13. The method for generating an automatic reproduction control file of claim 10,
    wherein the time information includes an information which defines a total reproducing time of a group to which the time information belongs.

14. The method for generating an automatic reproduction control file of claim 8,
    wherein the time information is written, in the automatic reproduction control file, adjacent to a data file corresponding to the time information.

15. An apparatus for reproducing a data file, said apparatus comprising:
    a read out part for reading out the automatic reproduction control file from a storage disposed inside of the apparatus or outside of the apparatus, wherein the automatic reproduction control file is used when at least one of a first data file including an image signal, a second data file including an audio signal and a third data file including an image signal and an audio signal is automatically reproduced,
    a controller for reading out the data file appointed by the automatic reproduction control file, based on the automatic reproduction control file been read out,
    wherein in the automatic reproduction control file, file designating information, which indicates the data file to be reproduced, is sequentially described in at least one group, and a group identifier designating each of the at least one group is described such that a plurality of groups having the same group identifier do not exist in the same automatic reproduction control file, and time information related to a reproduction time for automatically reproducing the first data file including the image signal and file designating information indicating the first data file are described in the same group, wherein, the automatic reproduction control file is generated such that, in case that a plurality of groups exists, the file designating information of an n-th group of the plurality of groups is automatically positioned between a group identifier of the n-th group and a group identifier of an (n+1)th group, and wherein the n-th group includes a time information related to a reproduction time when the data file included in the n-th group is automatically reproduced.

16. The apparatus for reproducing a data file of claim 15, wherein the controller reproduces sequentially the data file designated by the file designating information according to an order that the file designating information is described.

17. The apparatus for reproducing a data file of claim 15, wherein when character information is further described in the automatic reproduction control file stored in the storage, the controller combines a first data file including an image signal of which file designating information is described in the same group in which the described character information is included and the character information and reproduces a combination of the first data file and the character information.

18. A method for reproducing a data file, said method comprising:

reading out an automatic reproduction control file from a storage disposed inside of the apparatus or outside of the apparatus, wherein the automatic reproduction control file is used when at least one of a first data file including an image signal, a second data file including an audio signal and a third data file including an image signal and an audio signal is automatically reproduced;

a controller for reading out the data file appointed by the automatic reproduction control file, based on the automatic reproduction control file been read out, wherein in the automatic reproduction control file, file designating information, which indicates the data file to be reproduced, is sequentially described in at least one group, and a group identifier designating each of the at least one group is described such that a plurality of groups having the same group identifier do not exist in the same automatic reproduction control file and time information related to a reproduction time for automatically reproducing the first data file including the image signal and file designating information indicating the first data file are described in the same group, and wherein, the automatic reproduction control file is generated such that, in case that a plurality of groups exists, the file designating information of an n-th group of the plurality of groups is automatically positioned between a group identifier of the n-th group and a group identifier of an (n+1)th group, and wherein the n-th group includes a time information related to a reproduction time when the data file included in the n-th group is automatically reproduced.

19. The method for reproducing a data file of claim 18, wherein the data file is reproduced sequentially, and the data file is designated by the file designating information according to an order that the file designating information is described.

20. An apparatus for generating an automatic reproduction control file, which is used when at least one of a first data file including an image signal, a second data file including an audio signal and a third data file including an image signal and an audio signal is automatically reproduced, said apparatus comprising:

a controller for generating the automatic reproduction control file in which an information for automatically reproducing a part or all of the first data file, the second data file and the third data file is described, wherein in the automatic reproduction control file, file designating information, which indicates the data file to be automatically reproduced, is sequentially described in at least one group, and a group identifier designating each of the at least one group is described such that a plurality of groups having the same group identifier do not exist in the same automatic reproduction control file, wherein, in case that a plurality of groups exists, the automatic reproduction control file is generated such that the file designating information of an n-th group of the plurality of groups is positioned between a group identifier of the n-th group and a group identifier of an (n+1)th group, and wherein the n-th group includes a time information related to a reproduction time when the data file included in the n-th group is automatically reproduced.

21. A method for generating an automatic reproduction control file, which is used when at least one of a first data file including an image signal, a second data file including an audio signal and a third data file including an image signal and an audio signal is automatically reproduced, said method comprising:

controlling to generating the automatic reproduction control file in which an information for automatically reproducing a part or all of the first data file, the second data file and the third data file is described, wherein in the automatic reproduction control file, file designating information, which indicates the data file to be automatically reproduced, is sequentially described in at least one group, and a group identifier designating each of the at least one group is described such that a plurality of groups having the same group identifier do not exist in the same automatic reproduction control file, wherein, in case that a plurality of groups exists, the automatic reproduction control file is generated such that the file designating information of an n-th group of the plurality of groups is positioned between a group identifier of the n-th group and a group identifier of an (n+1)th group, and wherein the n-th group includes a time information related to a reproduction time when the data file included in the n-th group is automatically reproduced.

* * * * *